US009215692B2

(12) United States Patent
Nobukiyo et al.

(10) Patent No.: US 9,215,692 B2
(45) Date of Patent: Dec. 15, 2015

(54) RESOURCE ALLOCATION METHOD IN COMMUNICATION SYSTEM, RESOURCE ALLOCATION SYSTEM, AND BASE STATION USED FOR THE SAME

(75) Inventors: Takahiro Nobukiyo, Tokyo (JP); Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 656 days.

(21) Appl. No.: 12/734,380

(22) PCT Filed: Sep. 16, 2008

(86) PCT No.: PCT/JP2008/066632
§ 371 (c)(1),
(2), (4) Date: Apr. 28, 2010

(87) PCT Pub. No.: WO2009/057391
PCT Pub. Date: May 7, 2009

(65) Prior Publication Data
US 2010/0240384 A1    Sep. 23, 2010

(30) Foreign Application Priority Data

Oct. 31, 2007    (JP) .................................. 2007-282583

(51) Int. Cl.
*H04W 36/00*        (2009.01)
*H04W 40/00*        (2009.01)
(Continued)

(52) U.S. Cl.
CPC .............. *H04W 72/04* (2013.01); *H04W 24/00* (2013.01); *H04W 72/0413* (2013.01); *H04W 88/08* (2013.01)

(58) Field of Classification Search
CPC ..... H04W 8/245; H04W 36/30; H04W 36/18; H04W 36/08; H04W 4/16; H04W 92/02; H04W 76/02; H04W 8/26; H04W 88/06; H04W 72/04; H04W 16/10; H04M 1/72525; H04M 1/72522

USPC .......... 455/418, 436, 445, 450, 452.1, 502, 9; 370/252, 329, 335, 468; 707/201; 714/78, 748; 381/3; 379/220.01, 329
See application file for complete search history.

(56) References Cited

U.S. PATENT DOCUMENTS 5,539,829 A * 7/1996 Lokhoff et al. ................... 381/2
5,606,618 A * 2/1997 Lokhoff et al. ................... 381/2
(Continued)

FOREIGN PATENT DOCUMENTS

CN    1423495 A    6/2003
CN    1549527 A    11/2004
(Continued)

OTHER PUBLICATIONS

U.S. Appl. No. 60/971,526, filed Sep. 11, 2007.*
(Continued)

*Primary Examiner* — William D Cumming
(74) *Attorney, Agent, or Firm* — McGinn IP Law Group, PLLC

(57) ABSTRACT

The present invention aims to provide a resource allocation method in a communication system that can effectively suppress a transmission delay. Provided is a resource allocation system in a communication system which includes a terminal 110 and a base station 100, wherein data is regularly generated at the terminal, the base station allocates a resource to the terminal, and the terminal transmits data by using the resource. The terminal 110 includes a generated traffic monitoring unit 113 that monitors the data and, when a predetermined change occurs in the data, reports it to the base station. The base station 100 includes a resource management unit 102 that determines a resource allocation according to the report from the terminal.

6 Claims, 20 Drawing Sheets

(51) Int. Cl.
*H04W 72/00* (2009.01)
*H04W 72/04* (2009.01)
*H04W 24/00* (2009.01)
*H04W 88/08* (2009.01)

(56) References Cited

U.S. PATENT DOCUMENTS

| | | | | |
|---|---|---|---|---|
| 5,687,171 | A * | 11/1997 | Shin et al. | 370/335 |
| 6,097,733 | A * | 8/2000 | Basu et al. | 370/468 |
| 6,240,476 | B1 * | 5/2001 | Garcia et al. | 710/107 |
| 7,142,847 | B2 * | 11/2006 | Umeda et al. | 455/418 |
| 7,359,349 | B2 | 4/2008 | Kayama et al. | |
| 8,144,589 | B2 | 3/2012 | Meylan et al. | |
| 2002/0150228 | A1 * | 10/2002 | Umeda et al. | 379/220.01 |
| 2006/0183480 | A1 * | 8/2006 | Kato et al. | 455/436 |
| 2008/0025341 | A1 * | 1/2008 | Rao et al. | 370/468 |
| 2009/0069019 | A1 * | 3/2009 | Hayama et al. | 455/445 |
| 2009/0070650 | A1 * | 3/2009 | Bourlas et al. | 714/748 |
| 2009/0075667 | A1 * | 3/2009 | Bourlas | 455/452.1 |
| 2009/0305711 | A1 * | 12/2009 | Rinne et al. | 455/450 |
| 2010/0128692 | A1 * | 5/2010 | Aiba et al. | 370/329 |
| 2010/0157836 | A1 * | 6/2010 | Aiba et al. | 370/252 |
| 2010/0240384 | A1 * | 9/2010 | Nobukiyo et al. | 455/452.1 |
| 2010/0296460 | A1 * | 11/2010 | Akimoto et al. | 370/329 |
| 2011/0044281 | A1 * | 2/2011 | Chang et al. | 370/329 |
| 2011/0201341 | A1 * | 8/2011 | Choudhury et al. | 455/450 |
| 2012/0129447 | A1 * | 5/2012 | Nitta et al. | 455/9 |
| 2012/0134289 | A1 * | 5/2012 | Aiba et al. | 370/252 |
| 2012/0184311 | A1 * | 7/2012 | Yamamoto et al. | 455/502 |
| 2012/0184312 | A1 * | 7/2012 | Yamamoto et al. | 455/502 |
| 2012/0213179 | A1 * | 8/2012 | Bourlas | 370/329 |

FOREIGN PATENT DOCUMENTS

| | | |
|---|---|---|
| EP | 1 718 010 A2 | 11/2006 |
| JP | 2002-112321 A | 4/2002 |
| JP | 2003-163667 | 6/2003 |
| JP | 2003-169363 | 6/2003 |
| JP | 2006-319940 A | 11/2006 |
| JP | 2007-36517 | 2/2007 |
| JP | 2007-104705 | 4/2007 |
| JP | 2010-527208 A | 8/2010 |
| WO | WO 2006/073223 A1 | 7/2006 |
| WO | WO 2007/062284 A2 | 5/2007 |
| WO | WO 2007/088468 A2 | 8/2007 |
| WO | WO 2008/053552 A1 | 5/2008 |

OTHER PUBLICATIONS

3GPP TS36.300 V8.10, 3GPP Evolved Universal Terrestrial Radio Access and Evolved Universal Terrestrial Radio Access Network, pp. 56, Jun. 2007.
R2-072630, 3GPP TSG-RAN WG2 Meeting #58bis, HARQ operation in case of UL Power Limitation, Jun. 2007.
Chinese Office Action dated Sep. 19, 2012 with English translation.
Japanese Office Action dated Aug. 20, 2013 with English translation.
Japanese Office Action dated Jun. 25, 2013 with English translation.
NTT DoCoMo, Fujitsu, Mitsubishi Electric, "Persistent Scheduling in E-UTRA", 3GPP TSG RAN WG1 Meeting # 50, Athens, Greece, Aug. 20-24, 2007 (original R1-070098), R1-073705.
Uwano Shuta, et al. "Influence of asynchronous clock error in realtime application scheduling", Proceedings of 2007 IEICE General Conference B-5-184, Mar. 7, 2007.
Partial Supplementary European Search Report dated Sep. 8, 2015.

* cited by examiner

RESOURCE ALLOCATION METHOD IN COMMUNICATION SYSTEM, RESOURCE ALLOCATION SYSTEM, AND BASE STATION USED FOR THE SAME

TECHNICAL FIELD

The present invention relates to a resource allocation method in a communication system, a resource allocation system, and a base station used for the same, and, particularly, to a resource allocation technique in a communication system in which traffic is generated regularly.

BACKGROUND ART

In the uplink of LTE (Long Term Evolution) of which standardization is promoted in 3GPP (3rd Generation Partnership Project), both of so-called dynamic scheduling and persistent scheduling are under consideration as a scheduling scheme (cf. Non-Patent Document 1).

The former, dynamic scheduling, is scheduling that allocates a resource to a communication terminal (which is referred to hereinafter simply as a terminal) with respect to 1 TTI (Transmission Time Interval). The resource indicates RB (Resource Block) and MCS (Modulation and Coding Schemes). RB is a minimum unit of a frequency resource which can be allocated to 1 TTI. In the uplink of LTE, a plurality of RBs that are continuous along the frequency axis can be allocated to one terminal. MCS is a set of a modulation scheme and an error correction coding rate. The number of transmission bits is determined by combination of the allocated number of RBs and MCS.

The dynamic scheduling enables resource allocation according to channel quality and thus high throughput can be expected; however, the number of terminals for simultaneous transmission in 1 TTI is limited because the amount of signaling information is large. Therefore, in the case where traffic is generated regularly, when the size of one packet is small and traffic is generated at certain intervals such as VoIP (Voice over IP) traffic, there is a problem that the number of associated terminals (users) cannot be increased in spite of a sufficient allocable number of RBs due to the limited number of terminals for simultaneous transmission.

In order to solve such a problem, the latter, persistent scheduling, is under consideration. The persistent scheduling is scheduling that allocates a resource available at certain intervals, and there is an advantage that it is not necessary to transmit signaling information once a resource is allocated. Although dynamic resource allocation according to the channel quality is not possible, it is possible to increase the number of terminals (users) for simultaneous transmission in 1 TTI because the amount of signaling information is reduced.

Further, as one of the persistent scheduling, bundling is under consideration. The bundling is a method of transmitting a plurality of packets as a bundle in 1 TTI, and reduction of overhead is expected (cf. Non-Patent Document 2).

Related arts are Patent Documents 1 and 2 and so on.
[Patent Document 1]
Japanese Unexamined Patent Application Publication No. 2003-163667
[Patent Document 2]
Japanese Unexamined Patent Application Publication No. 2007-104705
[Non-Patent Document 1]
3GPP TS36.300 V8.1.0 (2007-06), 3GPP Evolved Universal Terrestrial Radio Access and Evolved Universal Terrestrial Radio Access Network, pp. 56

[Non-Patent Document 2]
R2-072630, 3GPP TSG-RAN WG2 Meeting #58bis, HARQ operation in case of UL Power Limitation

DISCLOSURE OF INVENTION

Technical Problems

In the case of transmitting traffic that is generated regularly in the persistent scheduling, a transmission delay arises as a problem, particularly in the bundling. The problem is described with reference to FIG. 22. It is assumed that traffic is VoIP traffic, an encoding period of an audio packet is 20 ms, the bundling is performed, two audio packets are transmitted in 1 TTI, and an allocation period of RB is 40 ms, which is twice the encoding period. Further, it is assumed that QoS (Quality of Service) is not satisfied if transmission cannot be completed within 50 ms from generation of a packet.

It is now assumed that a packet P3 is generated immediately after, i.e. 1 ms after, transmission of packets P1 and P2 (at time T0). A packet P4 is generated 20 ms after that, and the first transmission of the packets P3 and P4 are performed at time T1 (primary transmission). If the transmission at time T1 has failed due to degraded channel quality, retransmission is performed at time $$T2 = T1 + \text{HARQ (Hybrid Automatic Repeat request)}$$
$$\text{RTT (Round Trip Time)} \quad \quad \text{(Re 1)}.$$

Further, if the retransmission at time T2 has failed, next retransmission is performed at time $$T3 = T1 + 2*\text{HARQ RTT} \quad \quad \text{(Re 2)}.$$

If 1 RTT=6 ms and transmission has succeeded in the second retransmission, a transmission delay of the packet P3 exceeds 50 ms as follows.

$$\begin{aligned}
\text{Delay}(P3) &= T3 - T0 \\
&= T1 - T0 + 2*HARQRTT \\
&= 39 + 2*6 \\
&= 51 \text{ ms} > 50 \text{ ms}
\end{aligned}$$

$$\begin{aligned}
\text{Delay}(P4) &= T3 - (T0 + 20) \\
&= 31 \text{ ms} < 50 \text{ ms}
\end{aligned}$$

Further, there is a problem that the persistent scheduling cannot be implemented when a base station cannot be informed in advance that traffic is generated regularly or when a traffic generation period, a traffic size or the like is unknown even if it is recognized that traffic is regular.

Referring to Patent Documents 1 and 2, in order to prevent a transmission delay, the amount of accumulated packets or the length of queue is monitored in the former and the latter, respectively, and resource allocation that suppresses a transmission delay is performed based on the monitoring result. In the technique of Patent Documents 1 and 2, because a delay is estimated based on the amount of accumulated packets or the length of queue, which is a buffer size, resource allocation that effectively suppresses a transmission delay cannot be performed in any way for a change or a deviation in the transmission packet generation period or its timing.

The present invention aims to provide a resource allocation method in a communication system, a resource allocation system, and a base station used for the same that enable effective suppression of a transmission delay.

Technical Solution

A first method according to the present invention is a resource allocation method in a communication system including a terminal and a base station, where data is generated regularly in the terminal, the base station allocates a resource to the terminal, and the terminal transmits data by using the resource, which includes a monitoring step for monitoring the data and a step for making a report to the base station if a predetermined change occurs in the data in the terminal, and an allocation step for determining resource allocation based on the report from the terminal in the base station.

A second method according to the present invention is a resource allocation method in a communication system including a terminal and a base station, where data is generated regularly in the terminal, the base station allocates a resource to the terminal, and the terminal transmits data by using the resource, which includes a monitoring step for monitoring a transmission status of the data and a report step for making a report to the base station if the transmission status does not satisfy a predetermined condition in the terminal, and an allocation step for determining resource allocation based on the report from the terminal, in the base station.

A third method according to the present invention is a resource allocation method in a communication system including a terminal and a base station, where data is generated in the terminal, the base station allocates a resource to the terminal, and the terminal transmits data by using the resource, which includes a monitoring step for monitoring a reception status of the data, a determination step for determining whether the data is generated regularly based on the reception status, and an allocation step for allocating a resource periodically based on the monitoring result if it is determined that the data is generated regularly in the base station.

A fourth method according to the present invention is a resource allocation method in a communication system including a terminal and a base station, where data to be transmitted to the terminal arrives at the base station regularly, the base station allocates a resource to the terminal, and the base station transmits data by using the resource, which includes a monitoring step for monitoring a transmission status of the data and an allocation step for determining resource allocation based on the monitoring result if the transmission status does not satisfy a predetermined condition in the base station.

A fifth method according to the present invention is a resource allocation method in a communication system including a terminal and a base station, where data to be transmitted to the terminal arrives at the base station, the base station allocates a resource to the terminal, and the base station transmits data by using the resource, which includes a monitoring step for monitoring the data, a determination step for determining whether the data arrives regularly based on the monitoring result and an allocation step for allocating the resource based on the monitoring result if it is determined that the data arrives regularly in the base station.

A first system according to the present invention is a resource allocation system in a communication system including a terminal and a base station, where data is generated regularly in the terminal, the base station allocates a resource to the terminal, and the terminal transmits data by using the resource, wherein the terminal includes a monitoring means for monitoring the data and making a report to the base station if a predetermined change occurs in the data, and the base station includes an allocation means for determining resource allocation based on the report.

A second system according to the present invention is a resource allocation system in a communication system including a terminal and a base station, where data is generated regularly in the terminal, the base station allocates a resource to the terminal, and the terminal transmits data by using the resource, wherein the terminal includes a monitoring means for monitoring a transmission status of the data and making a report to the base station if the transmission status does not satisfy a predetermined condition, and the base station includes an allocation means for determining resource allocation based on the report from the terminal.

A third system according to the present invention is a resource allocation system in a communication system including a terminal and a base station, where data is generated in the terminal, the base station allocates a resource to the terminal, and the terminal transmits data by using the resource, wherein the base station includes a monitoring means for monitoring a reception status of the data, a determination means for determining whether the data is generated regularly based on the reception status, and an allocation means for allocating a resource based on the monitoring result if it is determined that the data is generated regularly.

A fourth system according to the present invention is a resource allocation system in a communication system including a terminal and a base station, where data to be transmitted to the terminal arrives at the base station regularly, the base station allocates a resource to the terminal, and the base station transmits data by using the resource, wherein the base station includes a monitoring means for monitoring a transmission status of the data, and an allocation means for determining resource allocation based on the monitoring result if the transmission status does not satisfy a predetermined condition.

A fifth system according to the present invention is a resource allocation system in a communication system including a terminal and a base station, where data to be transmitted to the terminal arrives at the base station, the base station allocates a resource to the terminal, and the base station transmits data by using the resource, wherein the base station includes a determination means for monitoring the data and determining whether the data arrives regularly based on a monitoring result, and an allocation means for periodically allocating a resource that can transmit the data within a predetermined time period from generation of the data based on the monitoring result if it is determined that the data arrives regularly.

A first base station according to the present invention is a base station in a communication system including a terminal and the base station itself, where data is generated regularly in the terminal, the base station allocates a resource to the terminal, and the terminal transmits data by using the resource, which includes an allocation means for determining resource allocation based on a report from the terminal indicating that a predetermined change occurs in the data.

A second base station according to the present invention is a base station in a communication system including a terminal and the base station itself, where data is generated regularly in the terminal, the base station allocates a resource to the terminal, and the terminal transmits data by using the resource, which includes an allocation means for determining resource allocation based on a report from the terminal indicating that a transmission status of the data does not satisfy a predetermined condition.

A third base station according to the present invention is a base station in a communication system including a terminal and the base station itself, where data is generated in the terminal, the base station allocates a resource to the terminal, and the terminal transmits data by using the resource, which includes a monitoring means for monitoring a reception status of the data, a determination means for determining whether the data is generated regularly based on the reception status, and an allocation means for allocating a resource based on the monitoring result if it is determined that the data is generated regularly.

A fourth base station according to the present invention is a base station in a communication system including a terminal and the base station itself, where data to be transmitted to the terminal arrives at the base station regularly, the base station allocates a resource to the terminal, and the base station transmits data by using the resource, which includes a monitoring means for monitoring a transmission status of the data, and an allocation means for determining resource allocation based on the monitoring result if the transmission status does not satisfy a predetermined condition.

A fifth base station according to the present invention is a base station in a communication system including a terminal and the base station itself, where data to be transmitted to the terminal arrives at the base station, the base station allocates a resource to the terminal, and the base station transmits data by using the resource, which includes a monitoring means for monitoring the data, a determination means for determining whether the data arrives regularly based on the monitoring result, and an allocation means for periodically allocating a resource that can transmit the data within a predetermined time period from generation of the data based on the monitoring result if it is determined that the data arrives regularly.

Advantageous Effects

A first advantageous effect by the present invention is that it is possible to perform persistent scheduling with a reduced transmission delay for regularly generated traffic. A first reason for that is because the traffic is monitored and a report to the base station is made if a predetermined change occurs in the traffic, and the base station allocates a periodical resource at timing to reduce a transmission delay based on the report. A second reason for that is because the transmission status of traffic is monitored and a report to the base station is made if the transmission status does not satisfy a predetermined condition, and the base station allocates a periodical resource at timing to reduce a transmission delay based on the report.

A second advantageous effect by the present invention is that it is possible to perform persistent scheduling with a reduced transmission delay even if the base station does not know in advance that it is regular traffic. A reason for that is the base station monitors the reception status of traffic and determines whether it is regular traffic or not, and if it is regular traffic, allocates a periodical resource at timing to reduce a transmission delay.

EXPLANATION OF REFERENCE

100 BASE STATION
101 BASE STATION OPERATING UNIT
102 RESOURCE MANAGEMENT UNIT
103 RECEIVED TRAFFIC MONITORING UNIT
104 BASE STATION
105 TRANSMITTED TRAFFIC MONITORING UNIT (BASE STATION)
106 TRAFFIC DETERMINATION UNIT
110 TERMINAL
111 TERMINAL OPERATING UNIT
112 TRAFFIC GENERATION UNIT
113 GENERATED TRAFFIC MONITORING UNIT
114 TRANSMITTED TRAFFIC MONITORING UNIT (TERMINAL)

BEST MODES FOR CARRYING OUT THE INVENTION

Embodiments of the present invention are described hereinafter in detail with reference to the drawings.

<First Embodiment>

Figure 1:
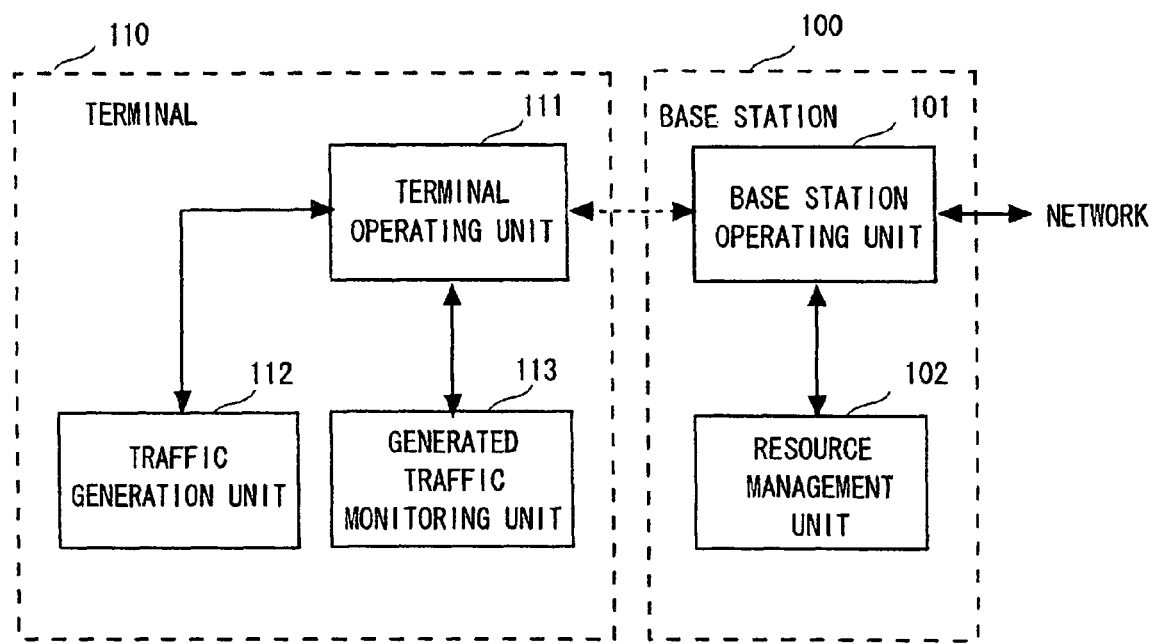
FIG. 1 is a block diagram showing a configuration of a communication system according to a first embodiment.

FIG. 1 is a view showing an example of a basic configuration of a communication system to which the present invention is applied. In this embodiment, a communication system is described by taking the uplink of LTE as an example. Referring to FIG. 1, this communication system includes a base station 100 and a terminal 110. The base station 100 is connected with the terminal 110 by a radio channel. The base station 100 is connected with a network, which is not shown. Further, the base station 100 can be connected with a plurality of terminals although not shown. Furthermore, there can be a plurality of a plurality of base stations.

Referring to FIG. 1, the base station 100 includes a base station operating unit 101 and a resource management unit 102. The terminal 110 includes a terminal operating unit 111, a traffic generation unit 112, and a generated traffic monitoring unit 113. The base station operating unit 101 has a function similar to that of a base station generally used in an LTE system, and its configuration and operation are known and a description thereof is omitted. In this embodiment, the base station operating unit 101 has a function of receiving traffic transmitted from the terminal 110, which is a general function. The resource management unit 102 has a function of managing RB allocation state and determining a resource to be allocated to the terminal.

The terminal operating unit 111 has a function similar to that of a terminal generally used in the LTE system, and its configuration and operation are known and a description thereof is omitted. In this embodiment, the terminal operating unit 111 has a function of transmitting traffic by an allocated resource, which is a general function. The traffic generation unit 112 has a function of notifying the terminal operating unit 111 of the start and end of traffic generation and a function of generating traffic. The generated traffic monitoring unit 113 has a function of monitoring traffic and reporting a monitoring result to the base station 100.

Figure 2:
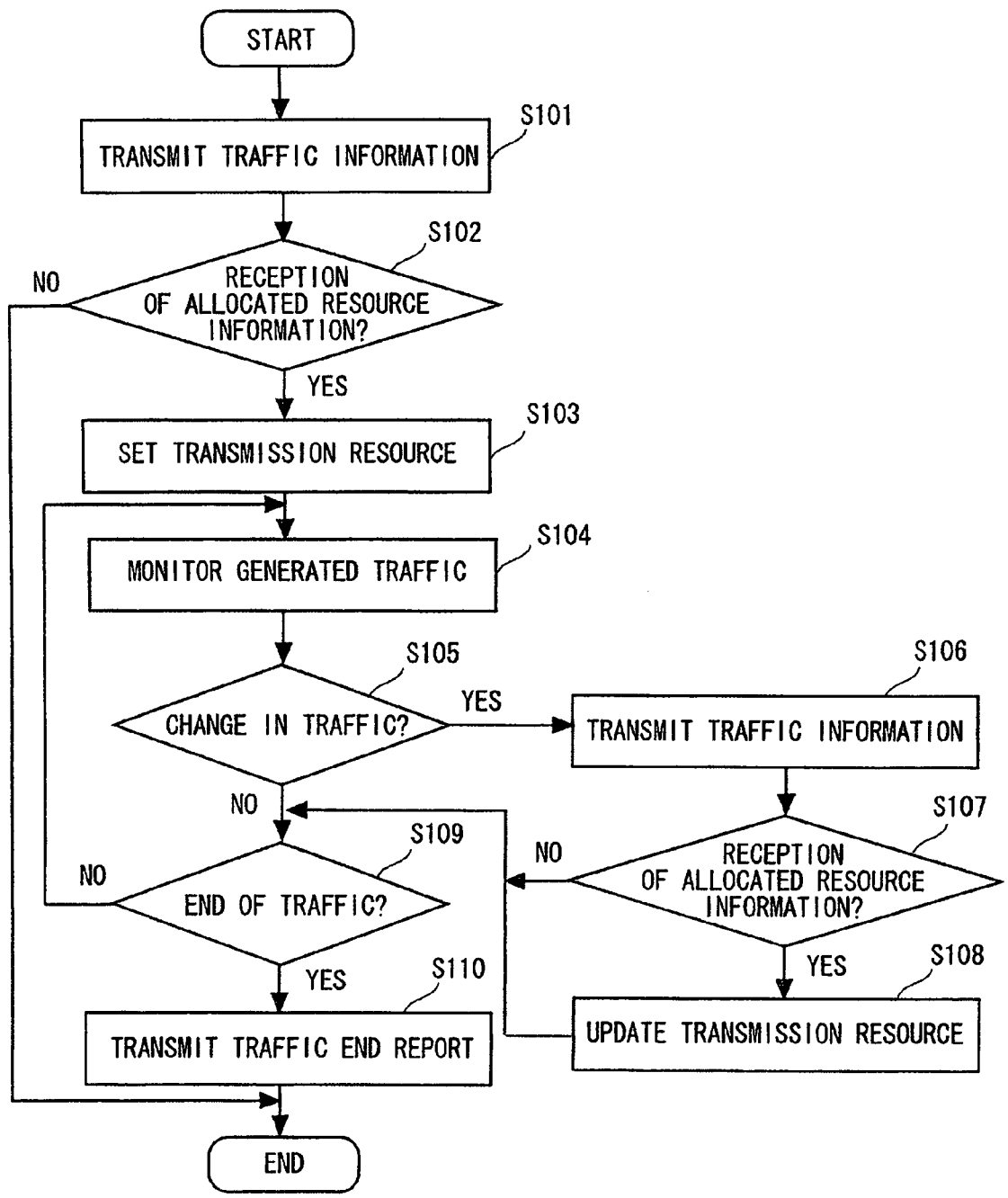
FIG. 2 is a flowchart showing an operation procedure of a terminal according to the first embodiment.
Figure 3:
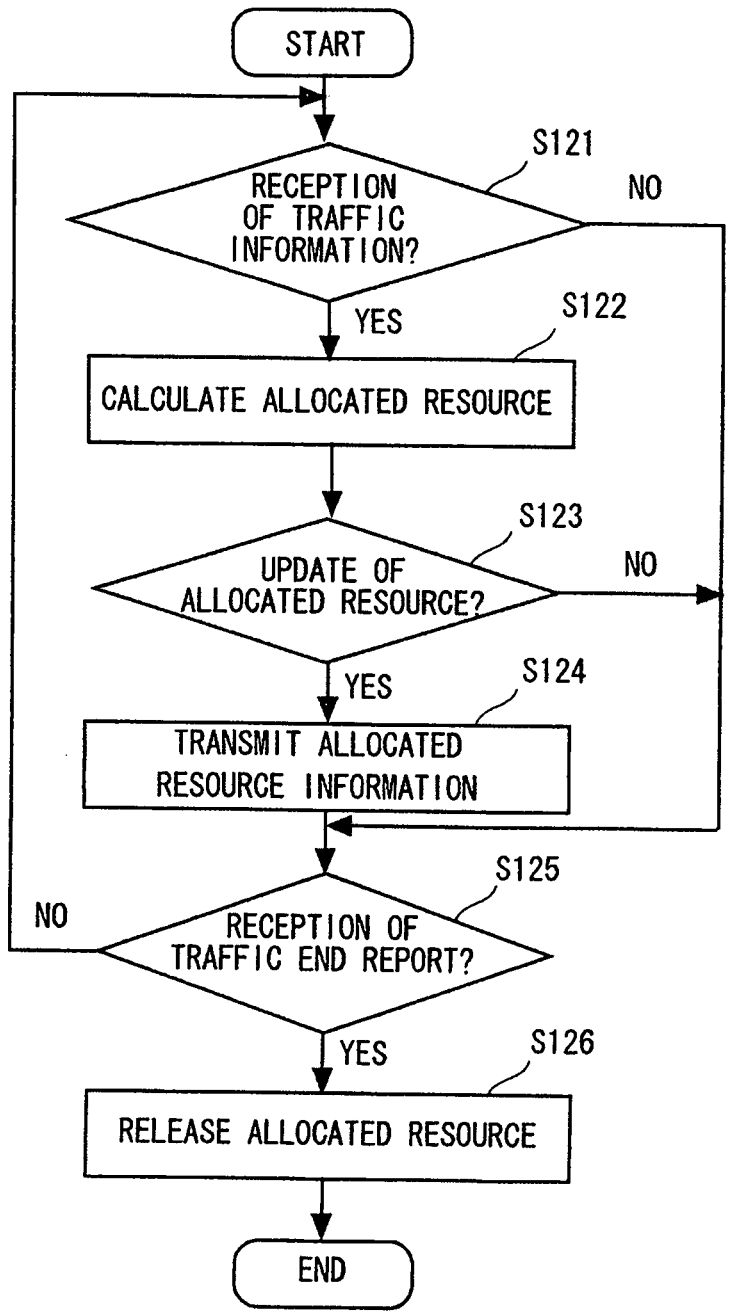
FIG. 3 is a flowchart showing an operation procedure of a base station according to the first embodiment.

Next, an operation according to this embodiment is described with reference to the drawings. FIGS. 2 and 3 show an operation procedure when the base station 100 performs resource allocation in the persistent scheduling for the terminal 110 in which regular traffic is generated, and they show flowcharts in the terminal 110 and the base station 100, respectively.

Figure 4:
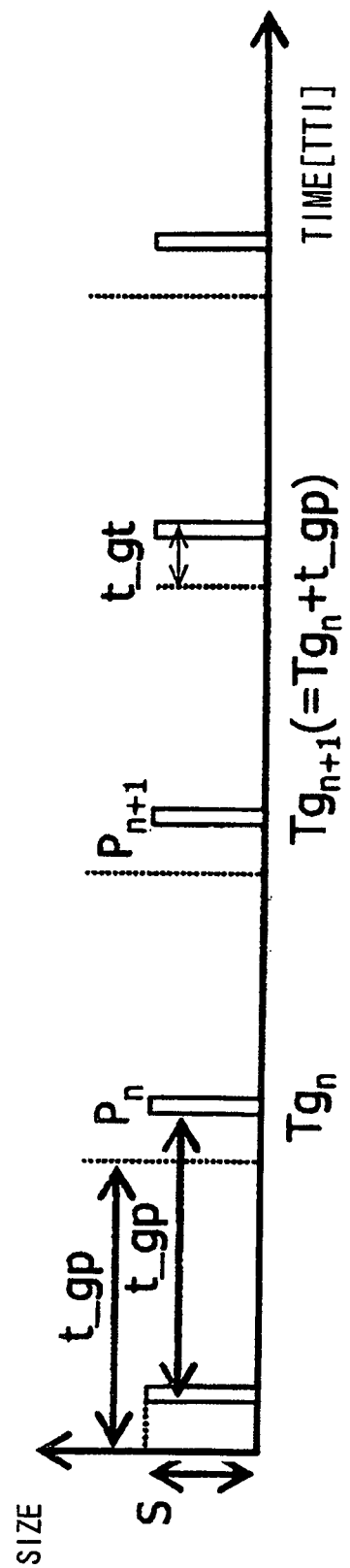
FIG. 4 is an image view of generated traffic.

An actual operation procedure in the terminal 110 is described with reference to FIG. 2. Upon generation of traffic, the terminal operating unit 111 transmits traffic information to the base station 100 (S101). The traffic information indicates parameters of a packet generation period, generation timing and a generation size. The packet is a unit of arrival of traffic. FIG. 4 shows an image view of the traffic information. The generation period is t_gp, the generation timing is t_gt, and the generation size is S (Size), and it is assumed that each parameter does not vary.

t_gt is represented by the reminder of dividing the current time by the generation period t_gp, and it is defined by the following expression.

$$t\_gt = \mathrm{MOD}(Tgn, t\_gp)$$

Tgn indicates the time when a packet Pn arrives at a transmission buffer of the terminal. If RB just before Tgn+1 is allocated without consideration of the generation timing, a delay increases and the problem that QoS cannot be satisfied is likely to occur. It is, however, not necessary to transmit known parameters of traffic information between the terminal 110 and the base station 100. For example, if the generation period and the generation size are previously known information between the terminal 110 and the base station 100, it is only necessary to transmit the generation timing.

Then, if allocated resource information can be received from the base station 100 (S102, Yes), the terminal operating unit 111 stores the allocated resource information (S103) and starts transmission of traffic by a resource allocated periodically. If allocated resource information cannot be received (S102, No), the process ends because no resource is allocated.

Figure 5:
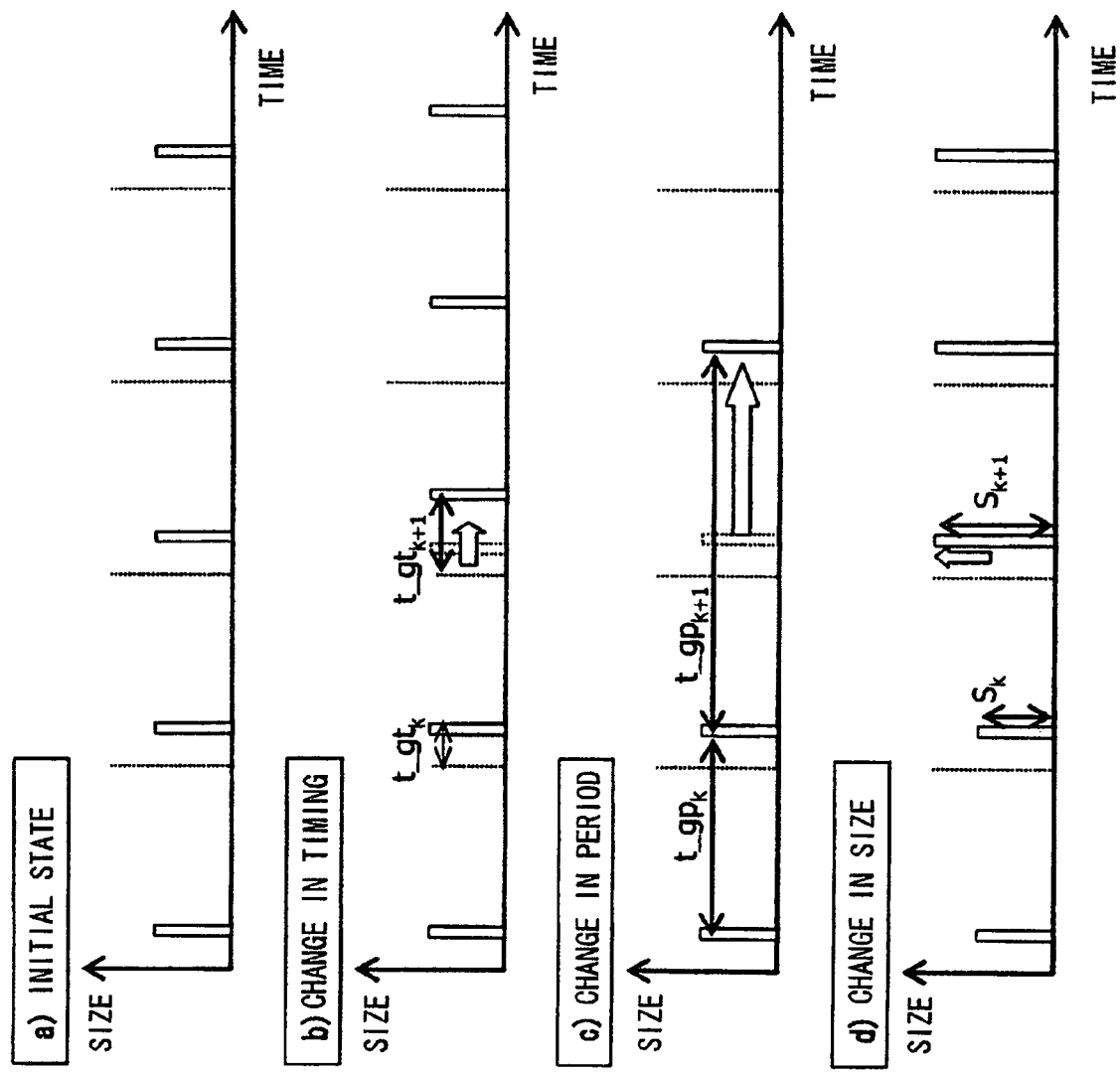
FIG. 5 is an image view of changes in traffic generation state.

Then, the generated traffic monitoring unit 113 monitors traffic (S104) and, if a predetermined change occurs in traffic (S105, Yes), transmits traffic information to the base station 100 (S106). What is transmitted may be only a parameter that has changed. FIG. 5 is an image view of changes in traffic generation state. a) is an initial state. b) is an example of a change in generation timing. c) is an example of a change in generation period. d) is an example of a change in generation size.

For example, with use of the parameters of FIG. 5, it is determined that a predetermined change has occurred when any of the following conditions cannot be satisfied.

$$|t\_gt\,k+1 - t\_gt\,k| < Th\_tgt$$

$$|t\_gp\,k+1 - t\_gp\,k| < Th\_tgp$$

$$|Sk+1 - Sk| < Th\_S$$

where Th_tgt, Th_tgp and Th_S respectively indicate thresholds.

Then, when updated allocated resource information by a change in traffic is received from the base station 100 (S107, Yes), the terminal operating unit 111 updates the allocated resource information (S108). If the allocated resource information is not received (S107, No), data is continuously transmitted by the allocated resource. Then, when traffic ends (S109), the terminal operating unit 111 transmits traffic end report to the base station 100 (S110), and the process ends.

Hereinafter, an actual operation procedure of the base station 100 is described with reference to FIG. 3. When the resource management unit 102 receives the traffic information from the terminal 110 (S121, Yes), it calculates allocated resources (S122), and when the allocated resources can be updated from the RB allocation state (S123, Yes), it transmits the allocated resource information to the terminal 110 (S124). A calculation method of the allocated resource is described later.

Figure 6:
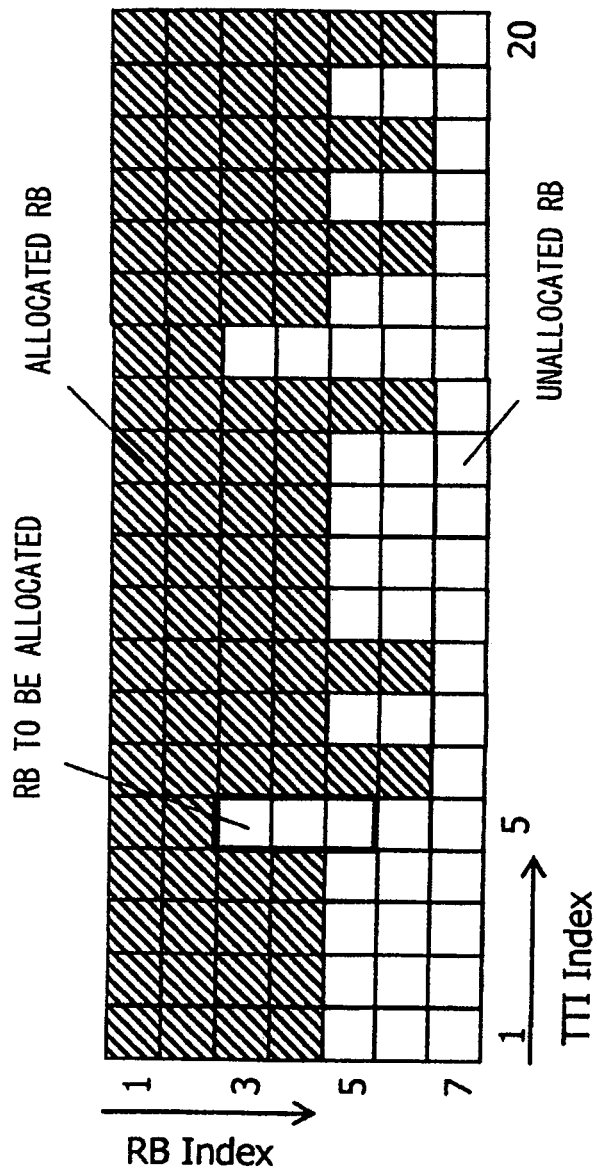
FIG. 6 is a management image view of RB allocation state.

FIG. 6 shows a management image of RB allocation state. It shows a management table of RBs in which the vertical axis indicates RB number (RB index), the horizontal axis indicates TTI number (TTI index), and at most seven RBs per 1 TTI can be used repeatedly in the period of 20 TTI. It shows a case where, when allocating three RBs, allocable TTI index=5 and RB index=3 to 5 are selected. The hatched part indicates allocated RBs, the blank part indicates unallocated RBs, and three RBs within the heavy line indicate RBs to be allocated.

Then, when the resource management unit 102 receives the traffic end report from the terminal 110 (S125, Yes), it performs resource release processing of the terminal and the process ends (S126). Hereinafter, a calculation method of the allocated resource, which is MCS and RB, is described. In this embodiment, as MCS, a predetermined unique fixed value is selected. Further, a transmission data size per 1 RB is defined as TDU (Transmission Data Unit). TDU is uniquely identified by MCS, and when allocating three RBs, for example, the transmission data size is 3*TDU. Further, the number of packets to be transmitted in 1 TTI is N_tp, which is a fixed value.

As parameters related to RB, the number of allocation RBs (N_RBs), an allocation period (t_ap) and TTI index (tti_index) are calculated. Further, time (Tbase[TTI]) corresponding to tti_index=0 is shared between the base station 100 and the terminal 110, and the current time is also shared. Tbase satisfies the following.

$$\mathrm{MOD}(Tbase, Tap) = 0$$

For sharing of the current time, a method of using GPS (Global Positioning System), a method of notifying the current time from the base station 100 to the terminal 110 at predetermined timing or the like is considered. Further, for sharing of Tbase, a method of giving notification from the base station 100 to the terminal 110 at predetermined timing or upon the transmission of allocated resource information or the like is considered.

N_RBs is as follows.

$$N\_RBs = CEIL((N\_tp*S)/TDU)$$

where CEIL indicates a function that returns an integer at which the number after the decimal point is rounded up. For example, CEIL(1.5)=2. t_ap is as follows.

$$t\_ap = N\_tp*t\_gp$$

tti_idx is determined in consideration of the RB allocation state while satisfying the following, so as to perform transmission at timing within t_gp/2 from arrival of a packet to the transmission buffer in order to reduce a transmission delay.

$$MOD(tti\_idx+t\_gp-t\_gt, t\_gp) \leq t\_gp/2$$

Further, which of persistent scheduling and dynamic scheduling is to be used as a resource allocation method of retransmission data can be selected arbitrarily. For example, if channel quality is low and an expectation value of the number of times of retransmission is large, it can be considered to use the persistent scheduling and reserve a resource for retransmission.

Further, although a unique value is selected as MCS in this embodiment, it is feasible to measure the channel quality of the terminal 110 at the time of receiving a pilot signal, a control signal or traffic and select MCS according to the channel quality. Further, although the traffic generation period, generation timing and generation size are fixed in this embodiment, they may be varied. In this case, the state of generated traffic is monitored by performing the following measurement. For example, for the generation period t_gp, an average value (t_gp_ave t) in a certain time period is measured. Next, it is compared with an average value (t_gp_ave t−1) of the last time, and it is determined that a predetermined change has occurred if the following conditional expression is not satisfied.

$$|t\_gp_{ave\ t} - t\_gp_{ave\ t-1}| > Th\_tgp$$

The same applies to the generation timing t_gt and the generation size S.

An illustrative example related to the calculation of the allocated resource is described hereinbelow. It is assumed that TTI is in units of ms, and the generation period t_gp=20 ms and the generation size S=320 bits are constant and known between the base station 100 and the terminal 110 among the traffic information. Further, it is assumed that the generation timing t_gt=5 ms is transmitted from the terminal 110 to the base station 100. Furthermore, parameters of the resource management unit 102 are assumed to be as follows.

$$TDU=170\ bits,\ N\_tp=2$$

First, the number of allocation RBs (N_RBs) is as follows.

$$N\_RBs=CEIL((N\_tp*S)/TDU)=CEIL(2*320/170)=4$$

Next, the allocation period (tap) is as follows.

$$t\_ap=N\_tp*t\_gp=2*20=40\ ms.$$

Figure 7:
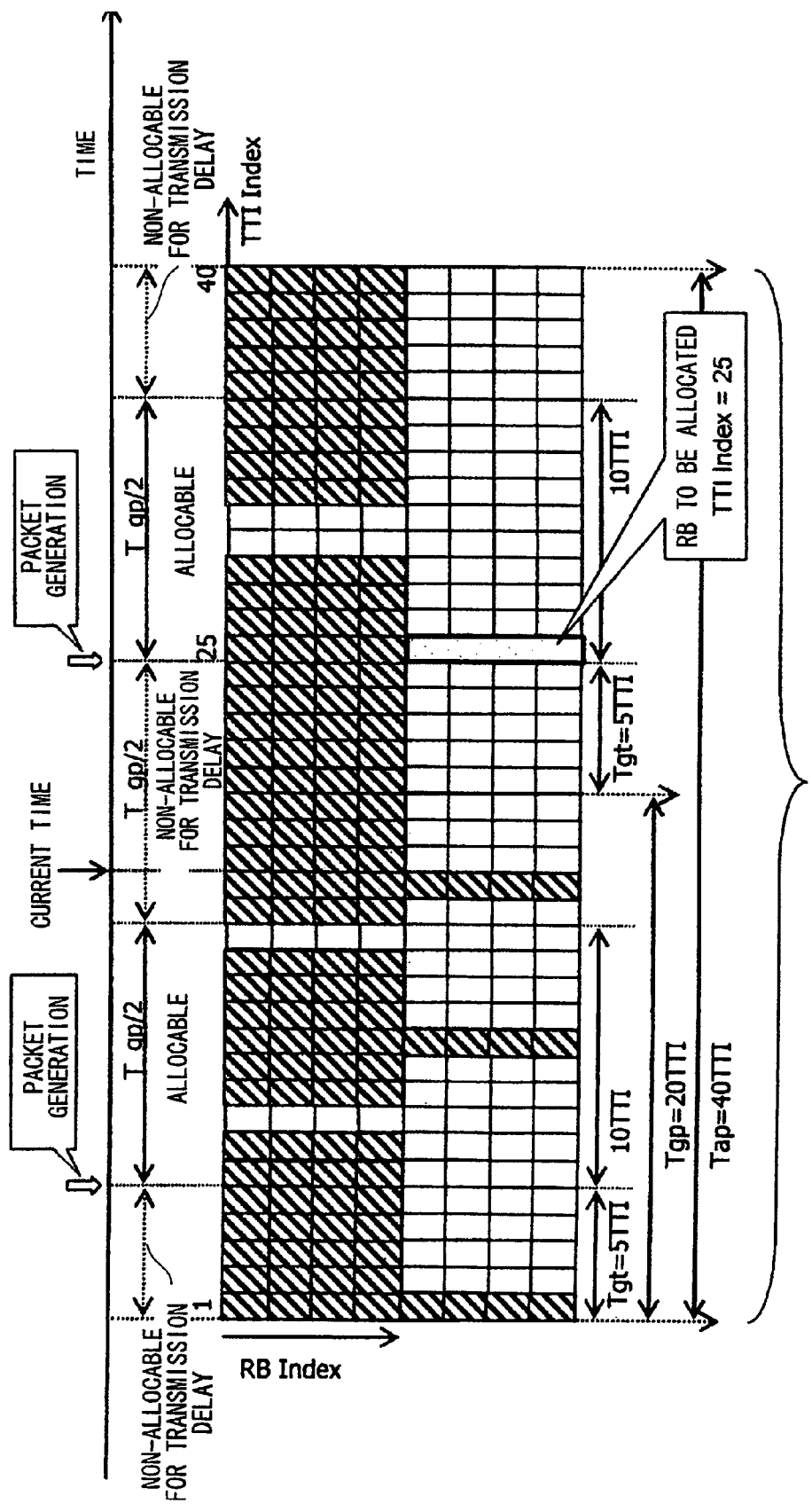
FIG. 7 is an image view of packet generation timing and RB allocation state.

Then, if the packet generation timing and the RB allocation state are as shown in FIG. 7, the nearest selectable TTI=25 is selected as tti_index. As described above, the terminal 110 can perform primary transmission of traffic once in 40 ms by using 4 RBs.

Figure 8:
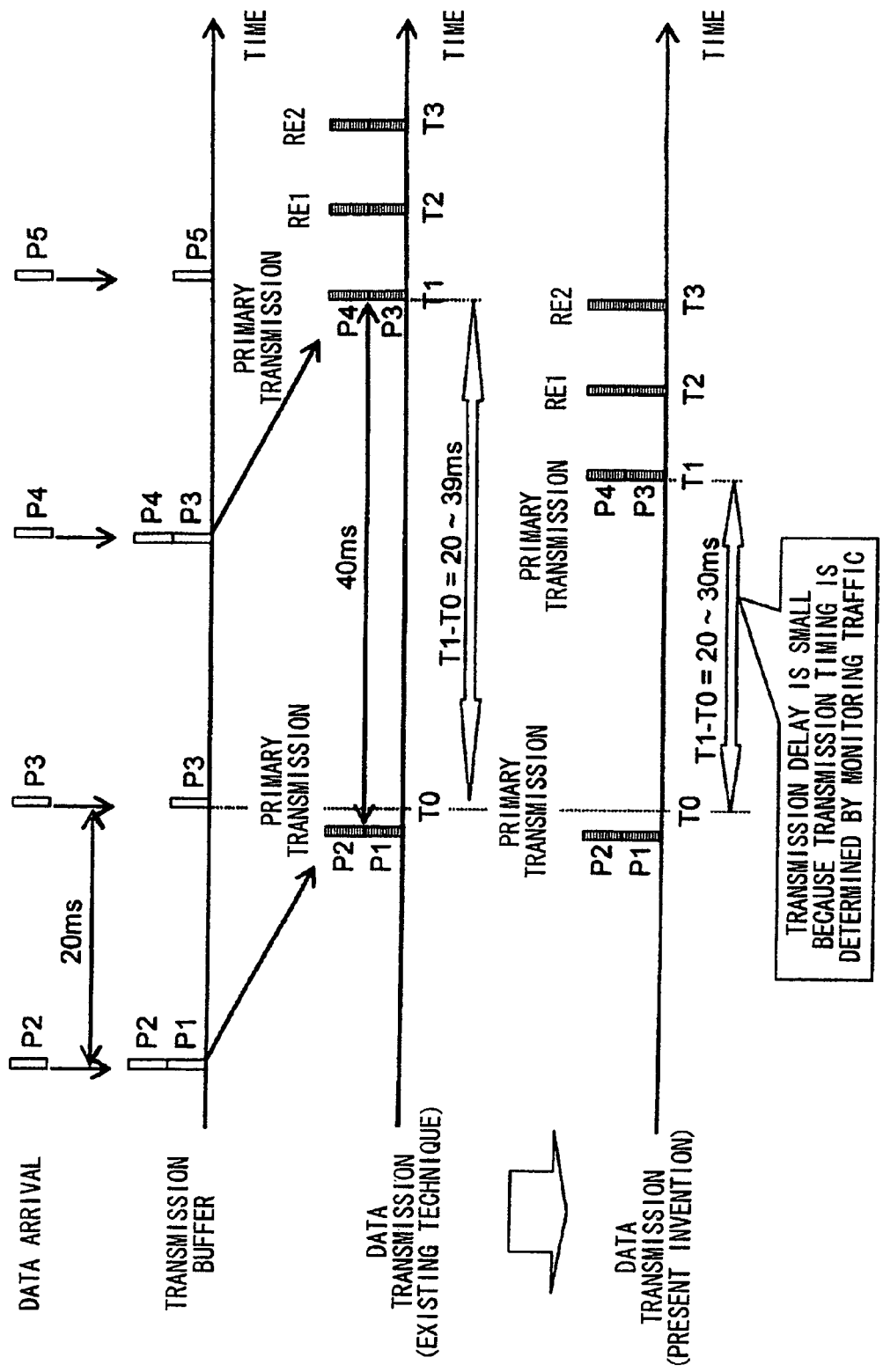
FIG. 8 is a timing chart of data transmission according to the first embodiment.
Figure 22:
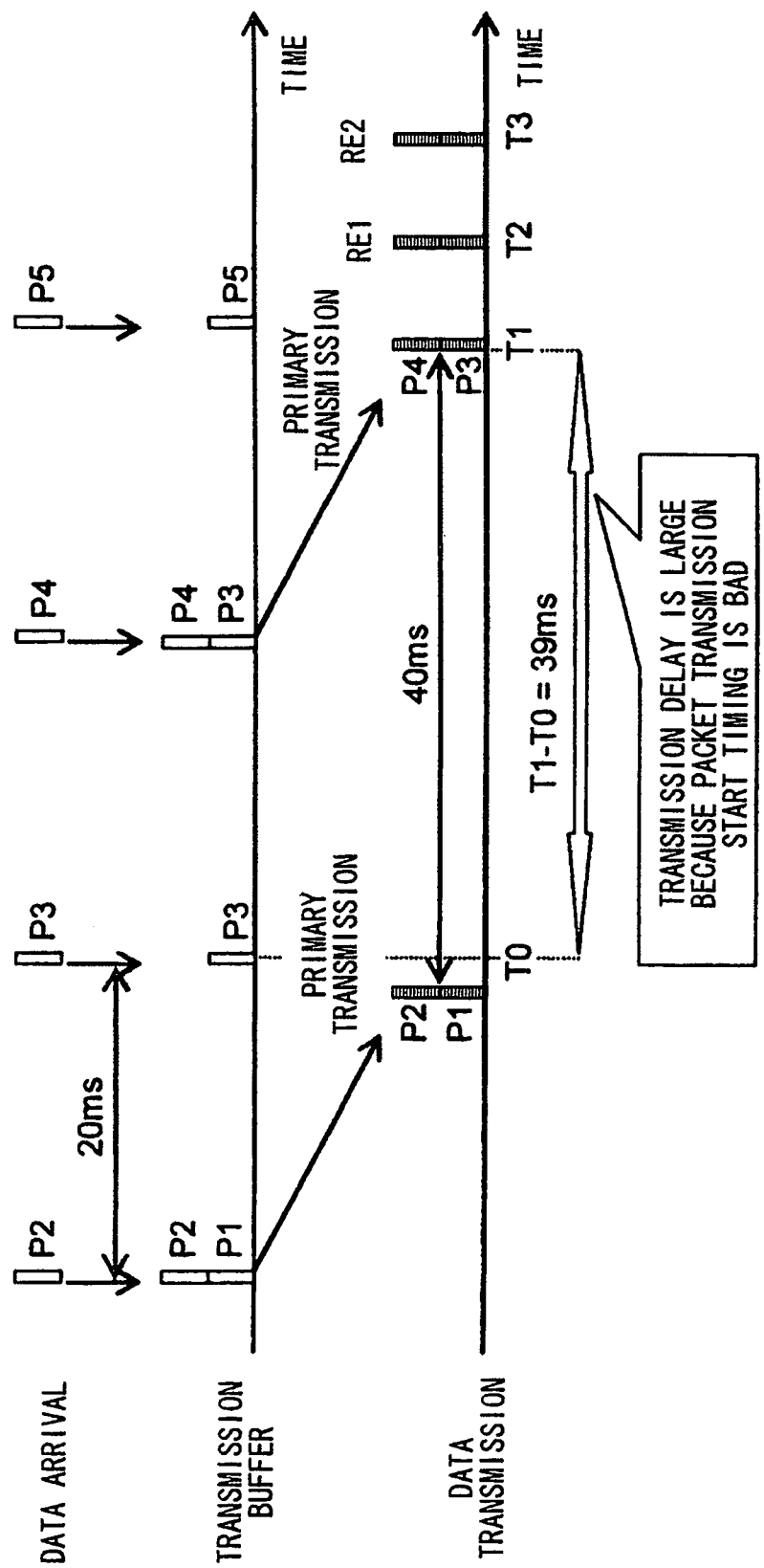
FIG. 22 is a timing chart of data transmission according to existing art.

FIG. 8 shows an effect of the case where this embodiment is applied in contrast to the existing example in FIG. 22. An expectation value of T1−T0 from packet generation to primary transmission is improved from 30 ms (=(20+39)/2) in the related art to 25 ms (=(20+30)/2).

<Second Embodiment>

Figure 9:
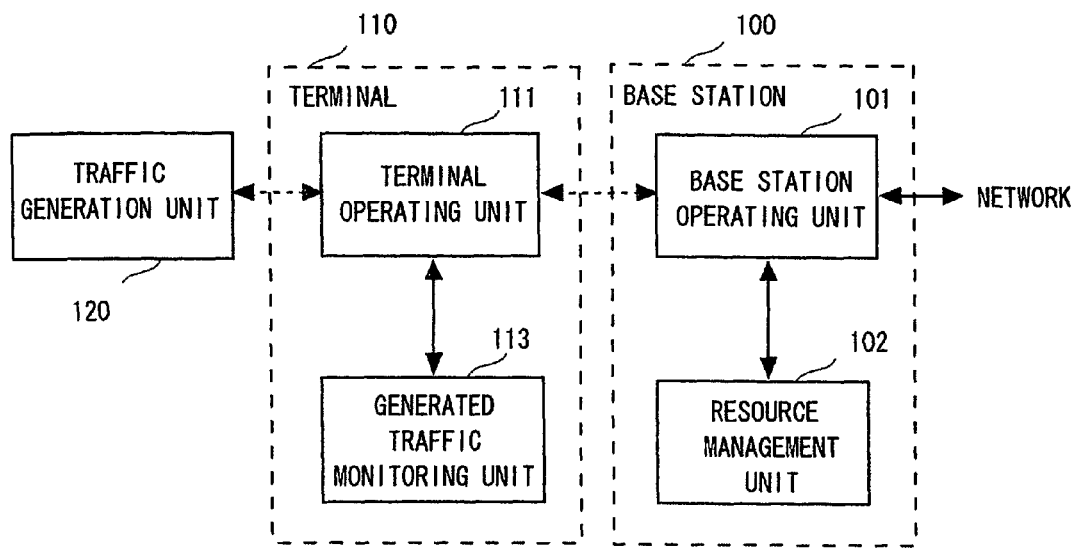
FIG. 9 is a block diagram showing a configuration of a communication system according to a second embodiment.

A second embodiment of the present invention is described hereinbelow. FIG. 9 is a view showing an example of a basic configuration of a communication system according to this embodiment, and the elements equivalent to those of FIG. 1 are denoted by the same reference symbols. Comparing the configuration of FIG. 9 to FIG. 1, a difference is in that the traffic generation unit 112 of the terminal 110 is eliminated, and a traffic generation device 120 is added instead to the outside of the terminal 110.

The traffic generation device 120 has a function similar to that of the traffic generation unit 112 in FIG. 1. Further, the terminal 110 and the traffic generation device 120 are connected by a radio link. For example, the case where the traffic generation device 120 is a personal computer, the terminal 110 is a wireless modem, the both are connected by a radio link such as Bluetooth (registered trademark), and Internet phone is made by the personal computer corresponds to this embodiment.

An operation of this embodiment is the same as that of the first embodiment shown in FIGS. 2 and 3. A trigger for update of resource allocation in persistent scheduling may be when the radio link between the terminal 110 and the traffic generation device 120 is unstable and the timing of a packet that arrives at the terminal 110 from the traffic generation device 120 is deviated or the like.

<Third Embodiment>

Figure 10:
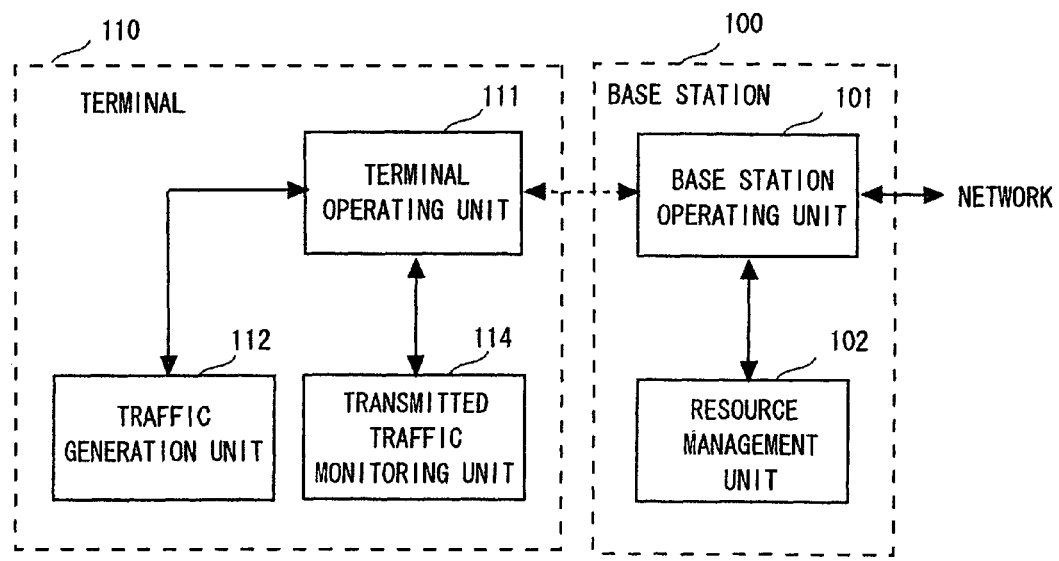
FIG. 10 is a block diagram showing a configuration of a communication system according to a third embodiment.

A third embodiment of the present invention is described hereinbelow. FIG. 10 is a view showing an example of a basic configuration of a communication system according to this embodiment, and the elements equivalent to those of FIG. 1 are denoted by the same reference symbols. Comparing the configuration of FIG. 10 to FIG. 1, a difference is in that the generated traffic monitoring unit 113 is eliminated, and a transmitted traffic monitoring unit 114 is added instead to the terminal 110.

The transmitted traffic monitoring unit 114 has a function of monitoring the transmission status of traffic and reporting a monitoring result to the base station 100. Further, the resource management unit 102 has a function of monitoring the resource usage state from the reception status of traffic in addition to the function in the first embodiment.

Figure 11:
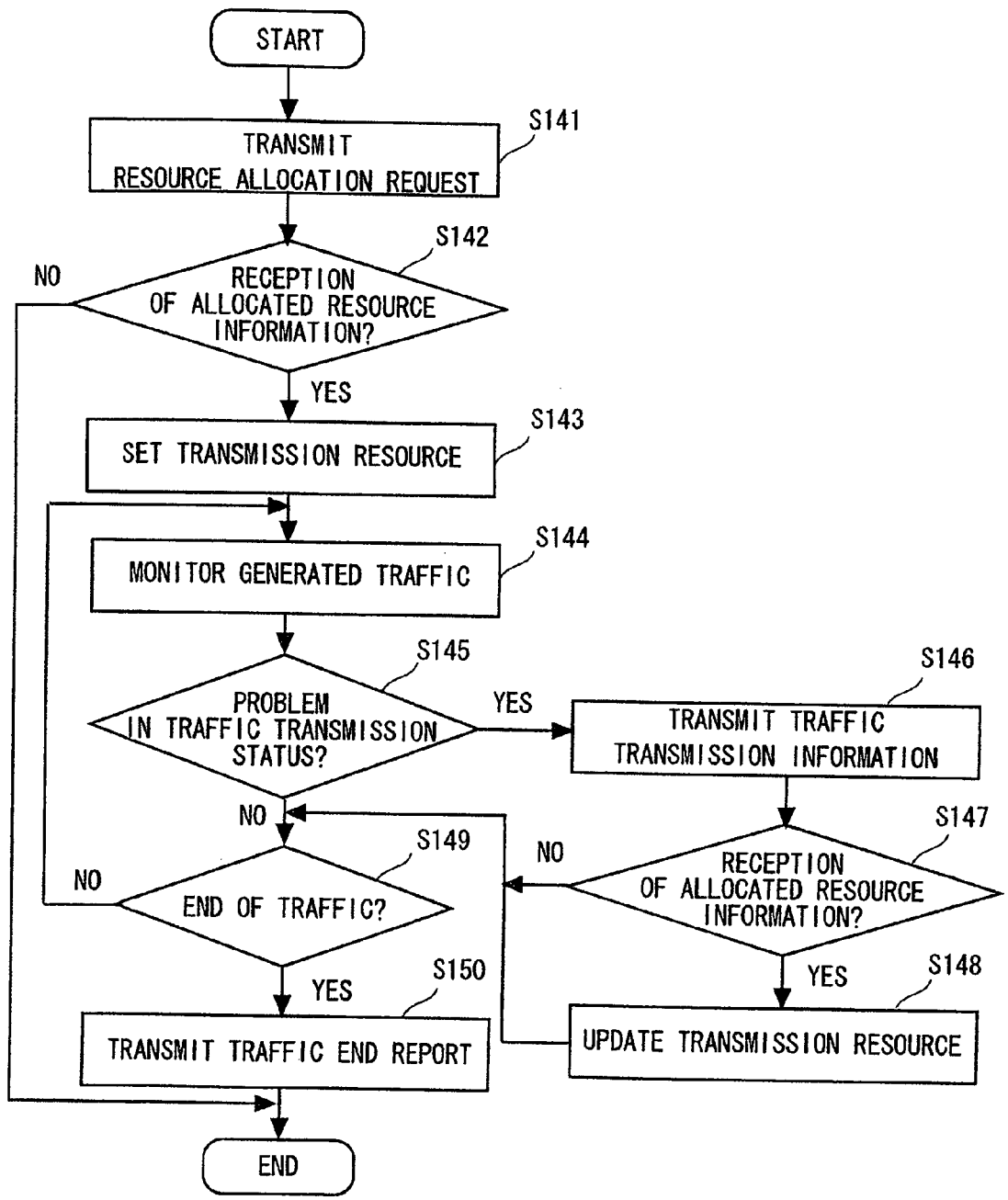
FIG. 11 is a flowchart showing an operation procedure of a terminal according to the third embodiment.
Figure 12:
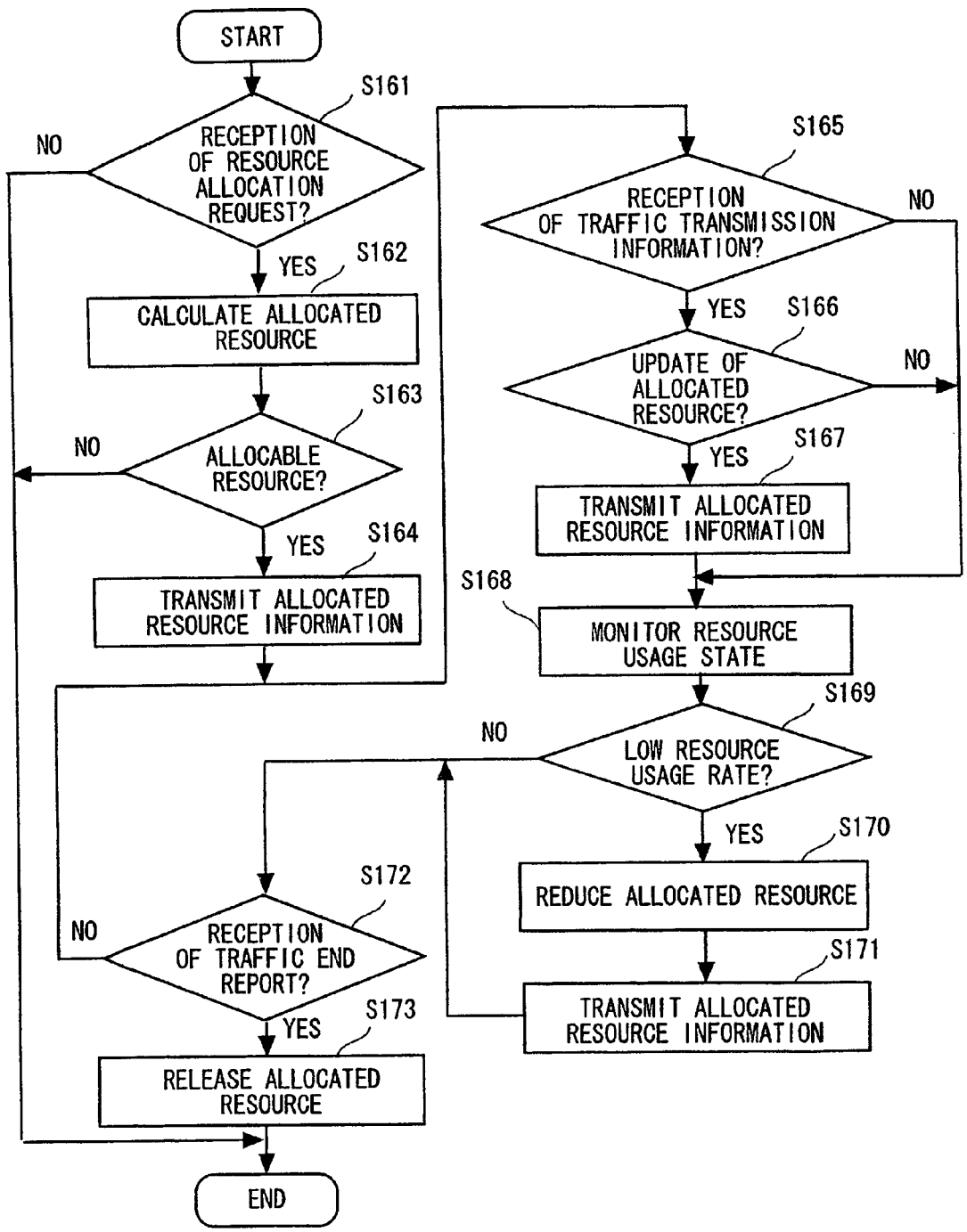
FIG. 12 is a flowchart showing an operation procedure of a base station according to the third embodiment.

Next, an operation according to this embodiment is described with reference to the drawings. FIGS. 11 and 12 are flowcharts showing an operation procedure when the base station 100 performs resource allocation in the persistent scheduling for the terminal 110 in which regular traffic is generated, and FIG. 11 is a flowchart of the terminal 110 and FIG. 12 is a flowchart of the base station 100.

An actual operation procedure in the terminal 110 is described with reference to FIG. 11. Upon generation of traffic, the terminal operating unit 111 transmits resource allocation request to the base station 100 (S141), and, if allocated resource information can be received from the base station 100 (S142, Yes), the terminal operating unit 111 stores the allocated resource information (S143) and starts transmission of traffic by the allocated resource. If allocated resource information cannot be received (S142, No), the process ends because no resource is allocated.

Then, the transmitted traffic monitoring unit 114 monitors the transmission status of traffic (S144). As the traffic transmission status, parameters of the number of packets in the transmission buffer (N_buff) and a transmission delay of a packet i (delay i) are monitored. An acknowledgement of an upper layer can be used for measurement of delay i.

Then, the number of packets in the transmission buffer N_buff and a newly measured delay i are compared with the respective thresholds (Th_N_buff, Th_delay), and if any one of the following conditional expressions (1) and (2) is not satisfied, it is determined that there is a problem in the traffic transmission status (S145), and a parameter that does not satisfy the conditional expression is transmitted as traffic transmission information to the base station (S146).

$$N\_buff < Th\_N\_buff \quad (1)$$

$$delay\ i < Th\_delay \quad (2)$$

For example, the cause that the expression (1) cannot be satisfied can be considered as the lack of allocated resources. Further, the cause that the expression (2) cannot be satisfied can be considered as at least one of the lack of allocated resources and inappropriate transmission timing. Then, if updated allocated resource information is received from the base station 100 (S147, Yes), the terminal operating unit 111 updates the allocated resource information (S148). If allocated resource information cannot be received (S147, No), data is continuously transmitted by the allocated resource. Then, when traffic ends (S149), the terminal operating unit 111 transmits traffic end report to the base station 100 (S150), and the process ends.

Hereinafter, an actual operation procedure of the base station 100 is described with reference to FIG. 12. When the resource management unit 102 receives the resource allocation request from the terminal 110 (S161, Yes), it calculates allocated resources which are determined by initial setting (S162), and when there'is an allocable resource from the RB allocation state (S163, Yes), it allocates a resource to the terminal 110 and transmits the allocated resource information to the terminal 110 (S164).

Then, if the traffic transmission information is received from the terminal 110 (S165, Yes), it calculates allocated resources, and when the allocated resources can be updated from the RB allocation state (S166, Yes), it transmits the allocated resource information to the terminal 110 (S167).

Figure 13:
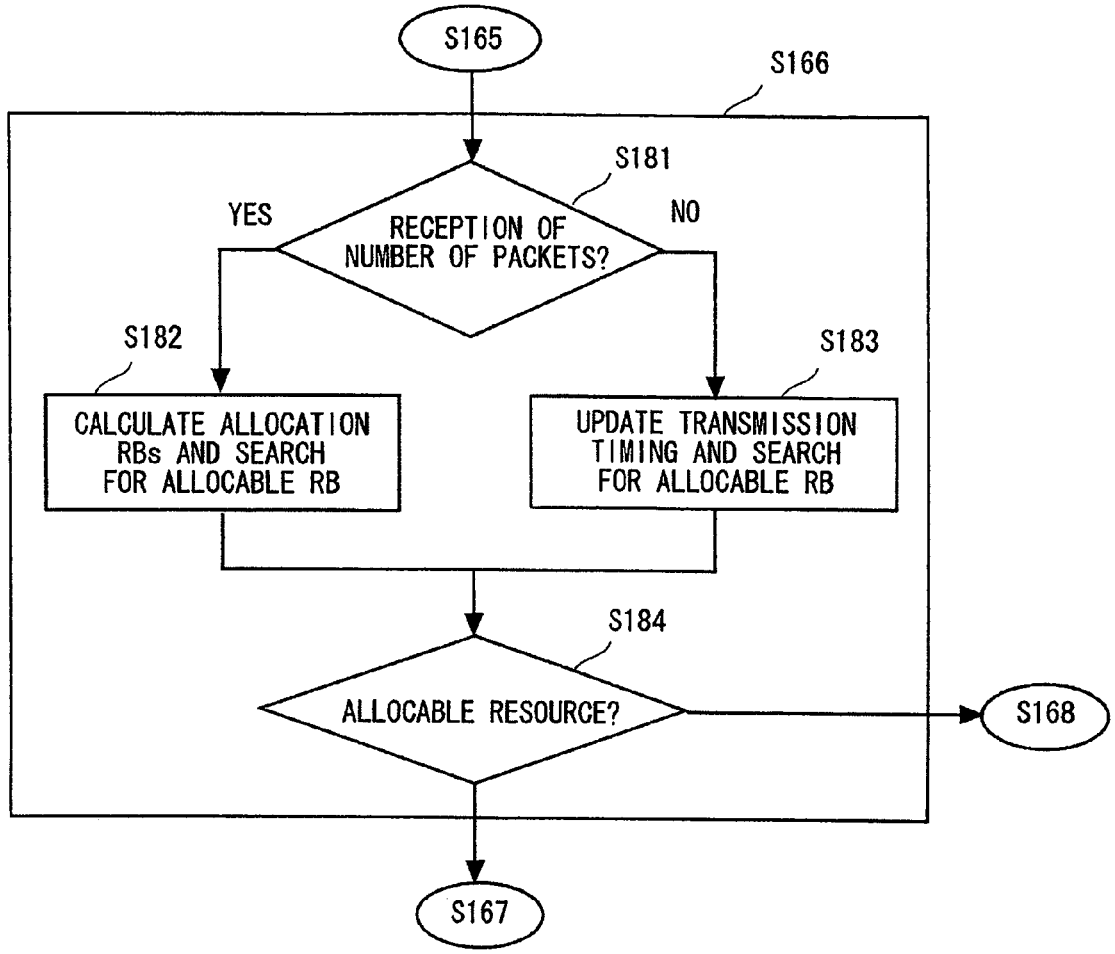
FIG. 13 is a flowchart showing an operation procedure of a calculation method of an allocated resource according to the third embodiment.

Referring to FIG. 13, a calculation method of an allocated resource in the step S166 of FIG. 12 is described in detail. As MCS, a predetermined unique fixed value is selected, as in the first embodiment. Further, the number of packets N_tp to be transmitted in 1 TTI is also a fixed value. The kinds of parameters related to RB are the number of allocation RBs N_RBs, the allocation period t_ap and tti_index, as in the first embodiment. The allocation period t_ap is not updated even when the traffic transmission information is received.

First, when the number of packets in the transmission buffer N_buff is received as the traffic transmission information (S181, Yes), the resource management unit 102 determines that the cause is the lack of resources, calculates N_RBs in the case of update by the following expression, and searches for an allocable tti_idx from the RB allocation state, as in the first embodiment of FIG. 9 (S182).

$$N\_RBs = N\_RBs + 1$$

It is preferred to search for tti_idx in descending order from the allocated tti_idx so as not to increase a transmission delay by the transmission timing. For example, if the allocated tti_idx is 5 and the allocation period is 20 TTI, search is performed in the following order.

tti_idx candidates→5, 4, . . . , 1, 20, 19, . . . , 7, 6

Further, when the number of packets in the transmission buffer N_buff is not received as traffic transmission information (S181, No), because only the transmission delay is received, it is determined that the cause is inappropriate transmission timing, and search is performed in descending order not from the allocated tti_idx so as not to increase a transmission delay (S183). For example, if the allocated tti_idx is 1 and the allocation period is 20 TTI, search is performed in the following order.

tti_idx candidates→20, 19, . . . , 3, 2

As a result of search in S182 and S183, if there is an allocable RB (S184, Yes), it transmits allocated resource information to the terminal 110 (S167).

Then, the resource management unit 102 monitors the resource usage state (S168) and, if a resource usage rate is lower than a predetermined threshold, it determines that allocated resources are excessive (S169, Yes), reduces the allocated resources (S170) and transmits allocated resource information to the terminal 110 (S171). Determination of the resource usage rate uses the following conditional expression.

$$\Sigma\{TD/(N\_RBs*TDU)\} < Th\_band$$

TD indicates a traffic size that is actually transmitted in a certain TTI, and N_RBs*TDU indicates a traffic size that can be transmitted by the allocated RB. Thus, TD/(N_RBs*TDU) indicates the usage rate of an allocated band. Σ indicates figuring out the sum of a result measured at RB allocation timing (tti_idx). Th_band is a resource usage rate threshold.

In the case of reducing allocated resources, N_RBs is updated as follows.

$$N\_RBs = MAX(N\_RBs - 1, 1)$$

Then, when the resource management unit 102 receives the traffic end report from the terminal 110 (S172, Yes), it performs resource release processing of the terminal and the process ends (S173).

Although the case of increasing and decreasing N_RBs one by one is described in this embodiment, it is feasible to increase it by two or more each by comparing the number of packets in the transmission buffer N_buff with the threshold Th_N_buff. Further, although the number of packets in the transmission buffer and the transmission delay are used as traffic transmission status in this embodiment, the number of packets may be replaced with a data size, and the transmission delay may be replaced with a throughput, for example.

<Fourth Embodiment>

Figure 14:
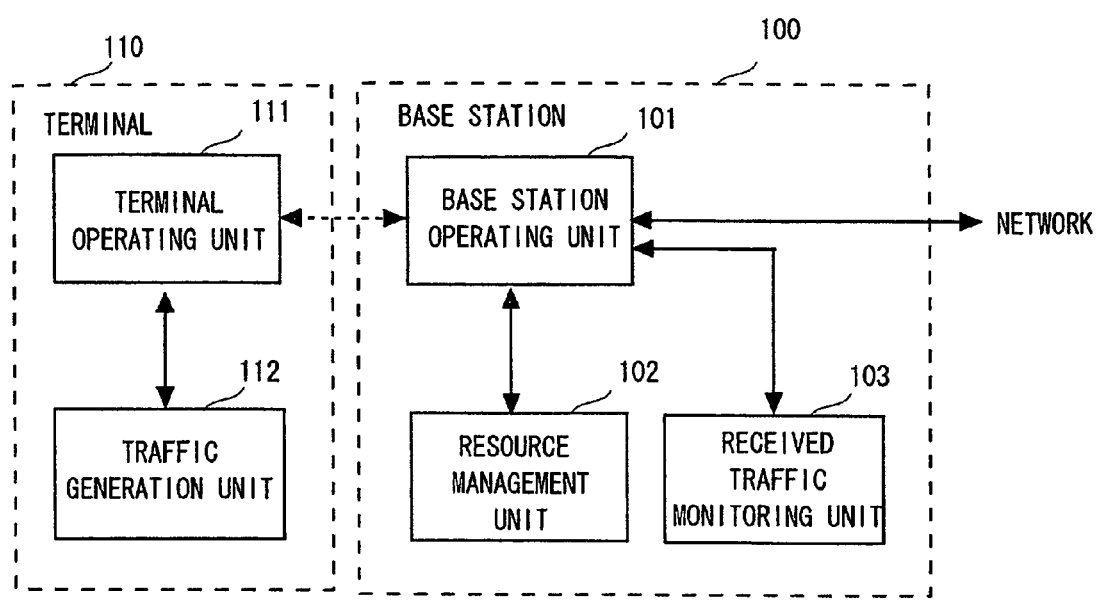
FIG. 14 is a block diagram showing a configuration of a communication system according to a fourth embodiment.

A fourth embodiment of the present invention is described hereinbelow. FIG. 14 is a view showing an example of a basic configuration of a communication system according to the fourth embodiment of the present invention, and the elements equivalent to those of FIG. 1 are denoted by the same reference symbols. Comparing the configuration of FIG. 14 to FIG. 1, a difference is in that the generated traffic monitoring unit 113 is eliminated from the terminal 110, and a received traffic monitoring unit 103 is added instead to the base station 100.

The received traffic monitoring unit 103 has a function of monitoring the reception status of traffic and sharing a monitoring result with the resource management unit 102. Further, the base station operating unit 101 has a function of measuring channel quality of the terminal 110 in addition to the function in the first embodiment. The channel quality is measured at the time of receiving a pilot signal, a control signal or traffic.

Figure 15:
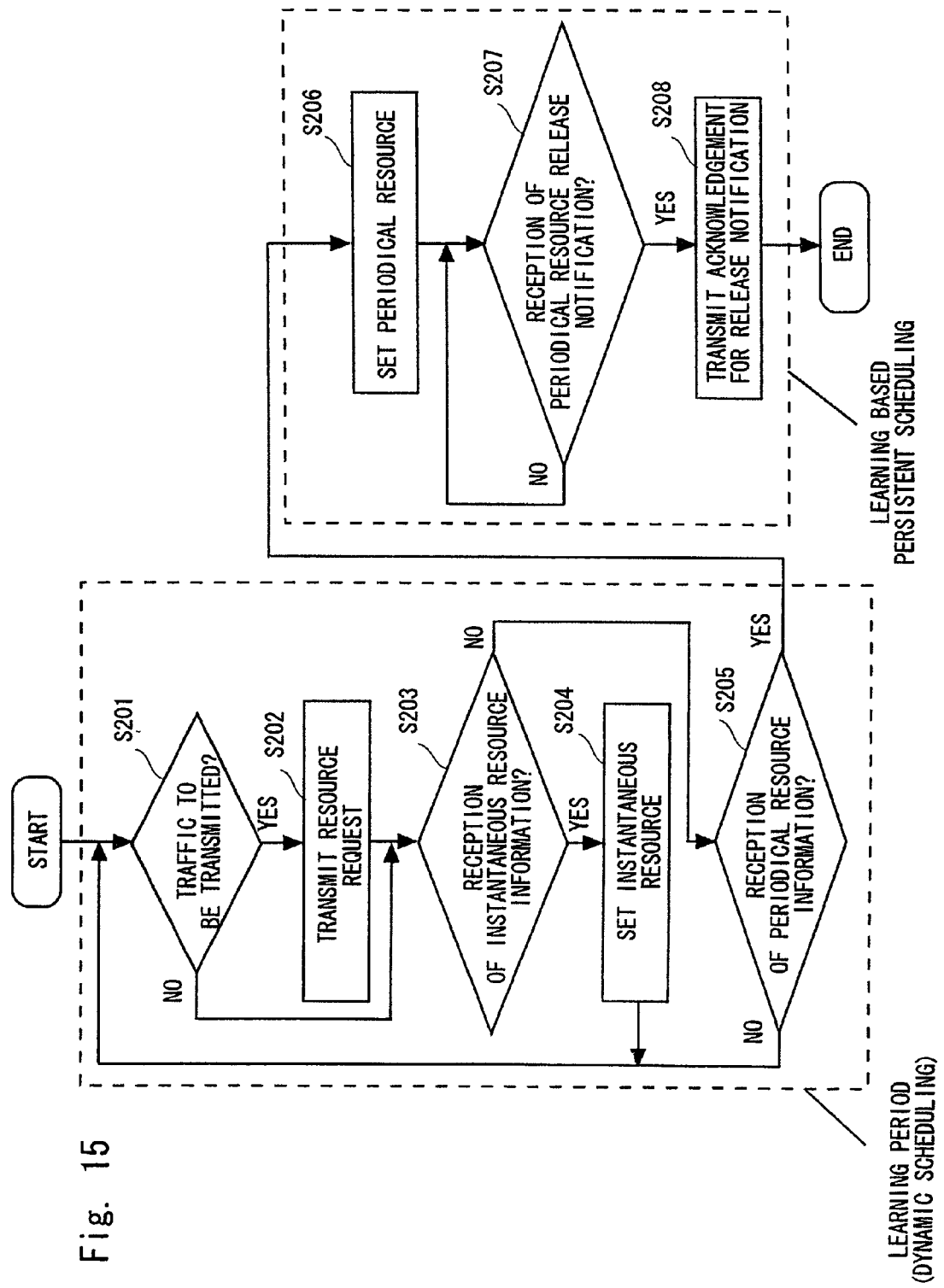
FIG. 15 is a flowchart showing an operation procedure of a terminal according to the fourth embodiment.
Figure 16:
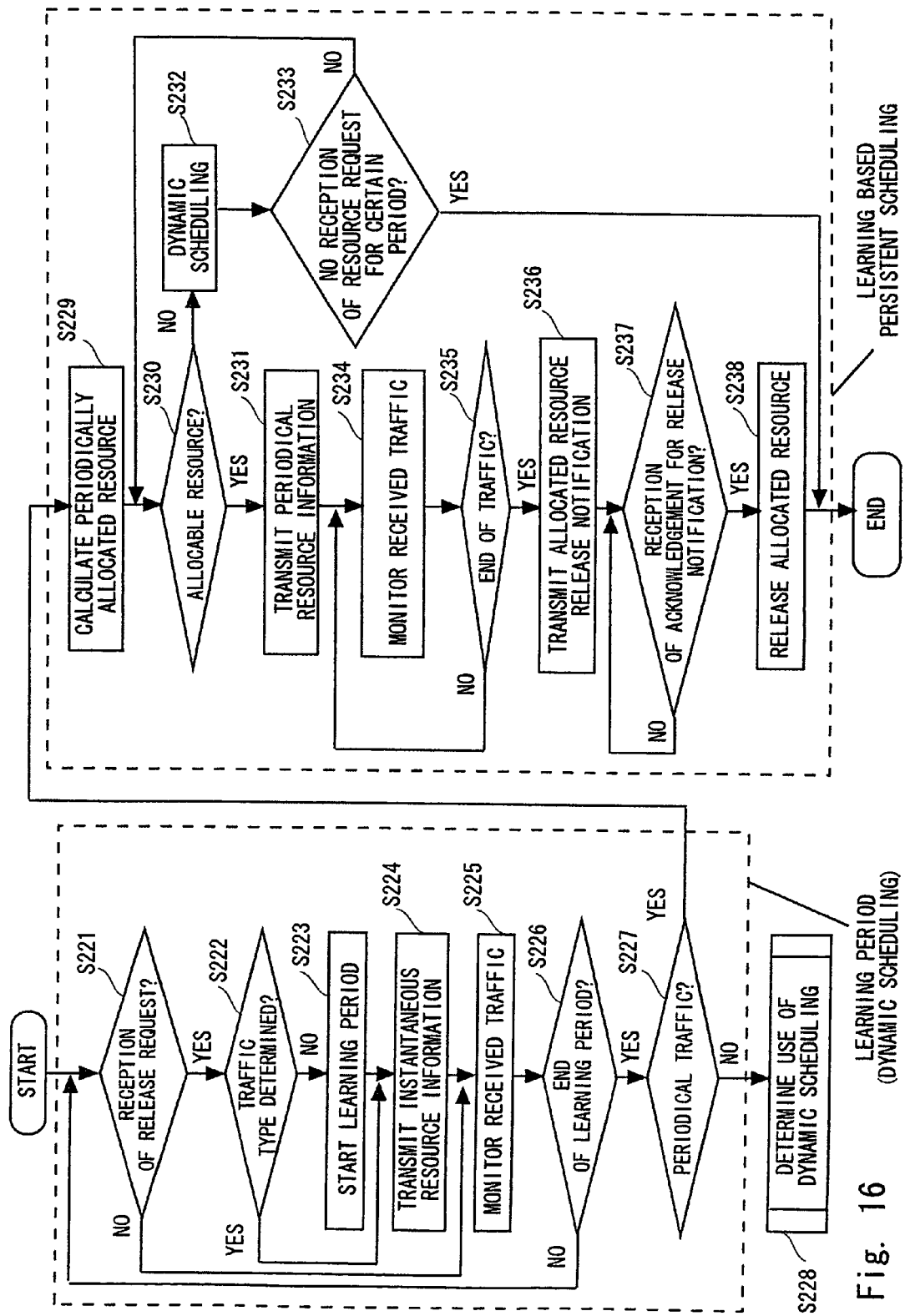
FIG. 16 is a flowchart showing an operation procedure of a base station according to the fourth embodiment.

Next, an operation according to this embodiment is described with reference to the drawings. FIGS. 15 and 16 are flowcharts showing an operation procedure when the base station 100 makes determination about the terminal 110 in which traffic is generated whether it is regular traffic based on the reception status, and if it is regular traffic, performs resource allocation in the persistent scheduling, and they are flowcharts in the terminal 110 and the base station 100, respectively.

The flowchart of the base station 100 in FIG. 16 is broadly composed of two parts. A first part is a part designated as learning period (dynamic scheduling). This part involves processing of analyzing traffic and determining whether it is regularly generated traffic. A second part is a part designated as learning based persistent scheduling, and if a result of determination is regular traffic such as VoIP, involves processing of allocating periodical resources based on an analysis result.

On the other hand, if it is irregular traffic that is generated in a burst such as FTP (File Transfer Protocol) file transfer, use of dynamic scheduling is continued. The structure of the flowchart of the terminal 110 in FIG. 15 also corresponds to the learning period and the learning based persistent scheduling.

An actual operation procedure in the terminal 110 is described with reference to FIG. 15. If there is traffic to be transmitted (S201), the terminal operating unit 111 transmits a resource request to the base station 100 (S202). Then, if instantaneous allocated resource information is received from the base station 100 (S203, Yes), the terminal operating unit 111 stores the allocated resource information and transmits traffic at specified transmission timing (S204).

On the other hand, if periodical allocated resource information is received from the base station 100 (S205, Yes), the terminal operating unit 111 stores the allocated resource information and starts periodical traffic transmission (S206). Then, if a release notification of periodical allocated resources is received (S207), the terminal 110 transmits an acknowledgement of the reception to the base station 100 and ends transmission of traffic by the persistent scheduling (S208). If generated traffic is irregular, the process from S201 to 5205 is repeated, and the dynamic scheduling is continued.

Hereinafter, an actual operation procedure of the base station 100 is described with reference to FIG. 16. When the resource management unit 102 receives the resource request from the terminal 110 (S221, Yes), if it is not yet determined whether traffic is regular or not (S222, No), it starts the learning period, which is a period to perform determination (S223). Then, it calculates MCS and allocation RBs based on the measured channel quality and transmits instantaneous allocated resource information to the terminal 110 (S224).

Then, the received traffic monitoring unit 103 monitors the reception status of traffic from the terminal 110 (S225). As the traffic reception status, the number of received packets (NumPacket), the size of a received packet i (Srxi), and the interval between time when a part of the packet i is received first and time when a part of the next packet i+1 is received first (t_period k) are monitored. The number of t_period k to be measured is NumPacket−1. Then, if a predetermined learning period has passed (S226), it analyzes traffic and determines whether it is regular or not (S227). Determination is performed as follows.

First, an average value (tperiod_ave) and a deviation (tperiod_dev) of packet generation intervals are estimated from the following expressions.

$$T\text{period\_ave} = \Sigma(t\_\text{period } k)/(\text{NumPacket}-1)$$

$$T\text{period\_dev} = [\Sigma(t\_\text{period } k - t\text{period\_ave})^2/(\text{NumPacket}-1)]^{(1/2)}$$

Σ indicates calculating the sum during the learning period. Further, an average value (S_ave) and a deviation (S_dev) of packet generation sizes are calculated in the same manner.

$$S\_\text{ave} = \Sigma(Srxi)/\text{NumPacket}$$

$$S\_\text{dev} = [\Sigma(Srxi - S\_\text{ave})^2/\text{NumPacket}]^{(1/2)}$$

If both of the following conditional expressions are satisfied, it is determined that traffic is regular.

$$t\text{period\_dev}/t\text{period\_ave} < Th\_\text{period} \quad (3)$$

$$S\_\text{dev}/S\_\text{ave} < Th\_\text{size} \quad (4)$$

Th_period and Th_size are thresholds for determining that traffic is regular. This is because the deviation with respect to the average value is considered to be small if traffic is regular.

Although the average value and the deviation are used for determination of regular traffic in this embodiment, a determination method is not limited thereto. For example, the case where the maximum value and the minimum value of each measurement value are smaller than a predetermined threshold may be used as a determination condition as follows.

$$(t\_\text{period max} - t\_\text{period min}) < Th\_\text{period2}$$

$$(Srx\text{max} - Srx\text{min}) < Th\_\text{size2}$$

where max and min indicate the maximum value and the minimum value of a measurement value.

If any of the above conditional expressions is not satisfied, it is determined that traffic is irregular (S227, No), and use of the dynamic scheduling is continued for the traffic (S228). If both of the above conditional expressions (3) and (4) are satisfied, it is determined that traffic is regular (S227, Yes), and a resource to be periodically allocated is calculated (S229). A calculation method of the allocated resource is the same as that in the first embodiment. The generation period t_gp and the generation size S are calculated as follows.

$$t\_gp = t\text{period\_ave}$$

$$S = S\_\text{ave}$$

Further, the generation timing t_gt is calculated by the following expression with use of the time (T_last) when a part of the packet received at the last of the learning period is received first.

$$t\_gt = \text{MOD}(T\_\text{last}, t\_gp)$$

Figure 17:
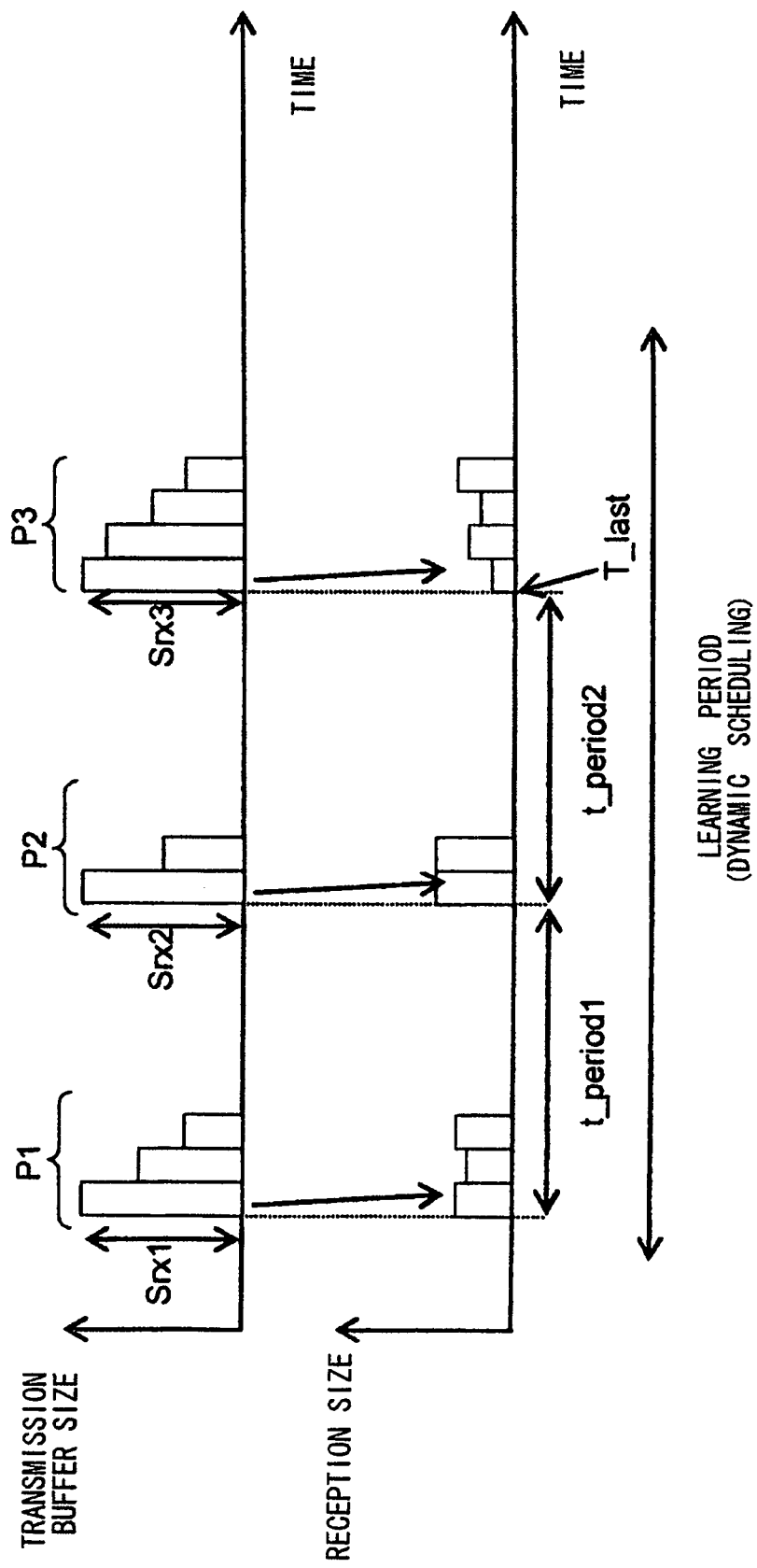
FIG. 17 is a timing chart of data reception according to the fourth embodiment.

FIG. 17 is an image view of reception timing. In the example of FIG. 17, the received traffic that can be monitored during the learning period is three packets. Each parameter can be calculated as follows.

$$t\text{period\_ave} = (t\_\text{period } 1 + t\_\text{period } 2)/(3-1)$$

$$t\text{period\_dev} = [\{(t\_\text{period } 1 - t\text{period\_ave})^2 + (t\_\text{period } 2 - t\text{period\_ave})^2\}/(3-1)]^{(1/2)}$$

$$S\_\text{ave} = (Srx1 + Srx2 + Srx3)/3$$

$$S\_\text{dev} = [\{(Srx1 - S\_\text{ave}) + (Srx2 - S\_\text{ave}) + (Srx3 - S\_\text{ave})\}/3]^{(1/2)}$$

Then, if there is a resource to be allocated from the RB allocation state (S230, Yes), allocated resource information is transmitted to the terminal 110 (S231). If there is no resource to be allocated, the dynamic scheduling is continued as an allocation candidate of the persistent scheduling until a resource is allocated (S232), and if the resource request is not received for a certain period of time (S233, Yes), it is determined that generation of traffic ends, it is excluded as the allocation candidate of the persistent scheduling, and the process ends.

Then, the received traffic monitoring unit 103 monitors received traffic (S234), and if the terminal 110 does not transmit traffic for a certain period of time (S235, Yes), it determines that generation of traffic ends and notifies the terminal 110 of release of a periodically allocated resource (S236). If an acknowledgement for the notification is received (S237, Yes), the periodically allocated resource is released, and the persistent scheduling for the terminal 110 ends (S238).

Figure 18:
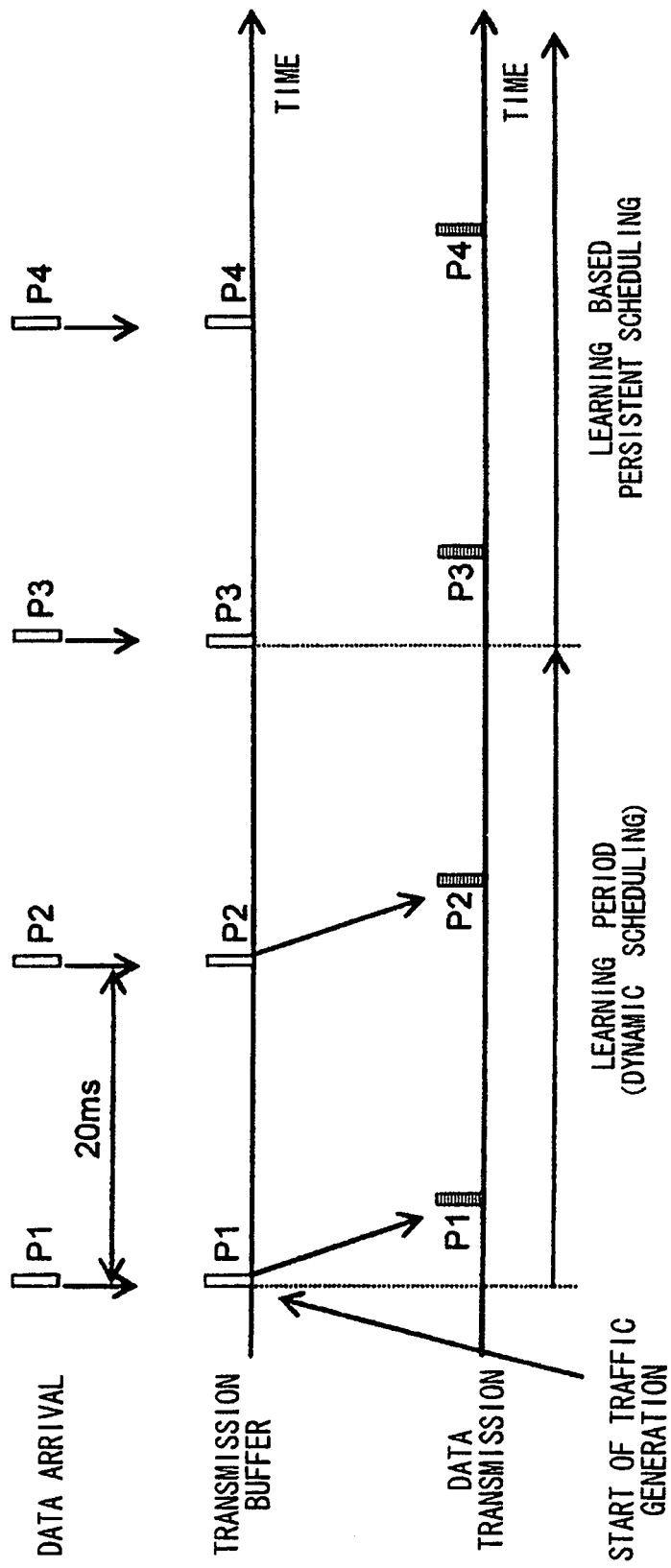
FIG. 18 is a timing chart of data transmission according to the fourth embodiment.

FIG. 18 is an image view of data transmission in the case where this embodiment is applied. Although the terminal transmits only a resource request when there is traffic to be transmitted in this embodiment, it may transmit a transmission buffer size, for example. In this case, the base station only needs to allocate a resource that enables transmission of data in the transmission buffer in the dynamic scheduling, so that use efficiency of radio resources is improved.

Further, if traffic is further monitored by the terminal 100 in this embodiment just like in the first embodiment, reallocation of an appropriate resource is possible in spite of a change in the state of traffic. Further, at the time of handover, if the base station 100 transfers information of periodical traffic of the terminal 110 that has made determination to a handover destination base station, it saves the handover destination base station the time and trouble to perform the learning period, which is efficient.

Figure 19:
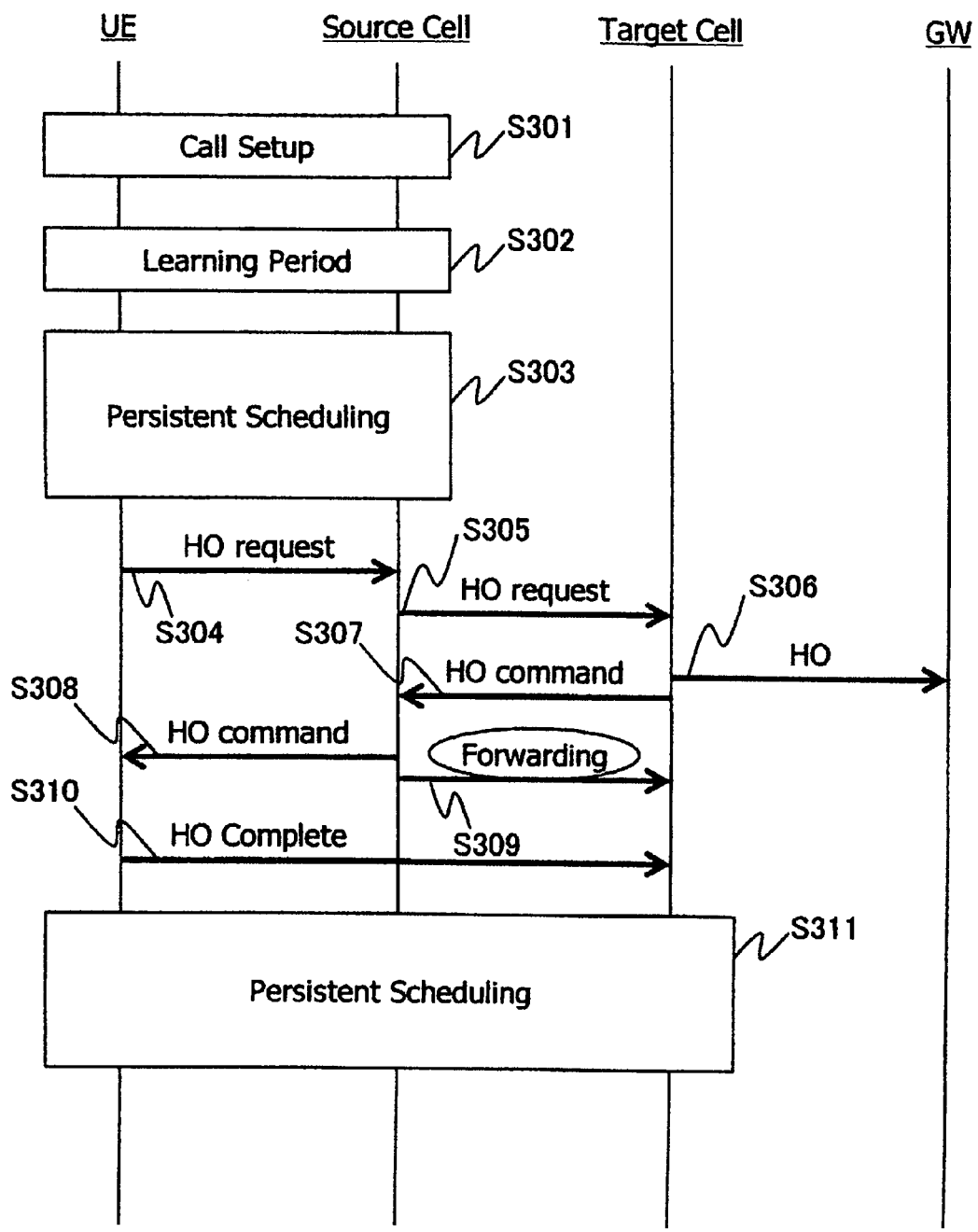
FIG. 19 is a signaling flow image view in a case where the first and fourth embodiments are combined.

FIG. 19 is an image example of a signaling flow in the case where this embodiment and the first embodiment are combined in VoIP traffic or the like. When transmitting traffic, UE (terminal) performs call setup with a source cell (handover source base station cell) (S301) and thereby establishes a radio link. Next, the source cell performs analysis of traffic in the learning period (S302). Then, based on the analysis result, the source cell performs resource allocation in the persistent scheduling (S303).

In the case of implementing handover, signaling is performed in the following procedure, for example. First, the UE transmits HO request (hangover request) to the source cell (S304), and the source cell transmits the HO request to a target cell (handover destination base station cell) (S305). Then, if handover is possible, the target cell gives notification about implementation of HO (handover) to GW (gateway) on the network side (S306) and, concurrently, transmits HO command (handover command) to the source cell (S307).

Then, the source cell transmits the HO command to the UE (S308) and, concurrently, forwards (transfers) information analyzed in the learning period to the target cell (S309). Then, the UE transmits HO complete to the target cell (S310) and thereby completes handover. After handover, the target cell does not perform the learning period and can perform the persistent scheduling (S311).

Transfer of information analyzed in the learning period is effective also when the implemented radio system is different between the source cell and the target cell. This is because the learning period can be omitted regardless of a radio system as long as the persistent scheduling is supported. This applies to the case where LTE is implemented in the source cell and WCDMA or wireless LAN is implemented in the target cell, for example.

<Fifth Embodiment>

Figure 20:
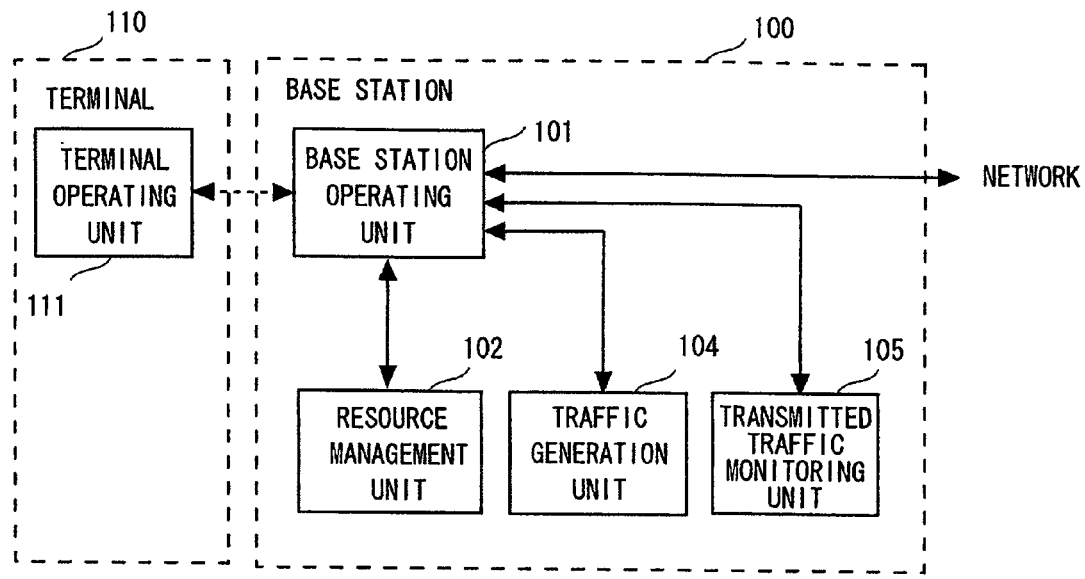
FIG. 20 is a block diagram showing a configuration of a communication system according to a fifth embodiment.

A fifth embodiment of the present invention is described hereinbelow. FIG. 20 is a view showing an example of a basic configuration when the above-described third embodiment is applied to downlink, and the elements equivalent to those of FIG. 10 are denoted by the same reference symbols. In FIG. 20, the terminal 110 includes only the terminal operating unit 111, and the base station 100 includes the base station operating unit 101, the resource management unit 102, a traffic generation unit 104 and a transmitted traffic monitoring unit 105. The traffic generation unit 104 and the transmitted traffic monitoring unit 105 have functions similar to those of the traffic generation unit 112 and the transmitted traffic monitoring unit 114, respectively, in FIG. 10.

An operation in this embodiment is the same as that of the first embodiment shown in FIGS. 2 and 3, and a description thereof is omitted. In the case of downlink, traffic reaches a transmission buffer of the base station through the network, and thus jitter in traffic or the like occurs. Thus, it is effective for a transmission delay to monitor the transmission status and reallocate allocated resources, namely, adjust allocated resources as in this embodiment.

<Sixth Embodiment>

Figure 21:
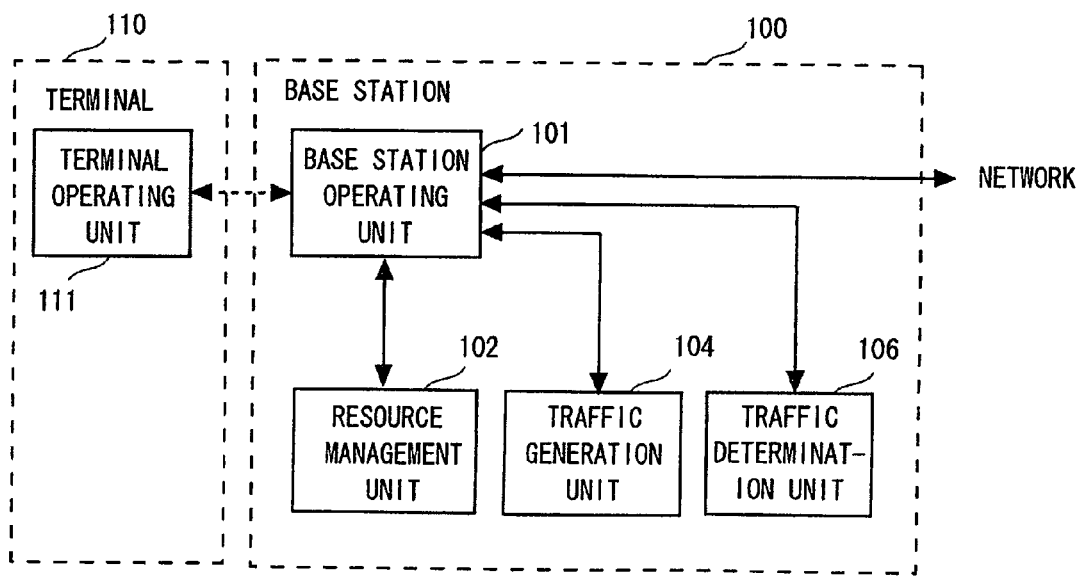
FIG. 21 is a block diagram showing a configuration of a communication system according to a sixth embodiment.

A sixth embodiment of the present invention is described hereinbelow. FIG. 21 is a view showing an example of a basic configuration when the above-described fourth embodiment is applied to downlink, and the elements equivalent to those of FIG. 14 are denoted by the same reference symbols. In FIG. 21, the terminal 110 includes only the terminal operating unit 111, and the base station 100 includes the base station operating unit 101, the resource management unit 102, a traffic generation unit 104 and a traffic determination unit 106. The traffic determination unit 106 has a function of monitoring traffic and determining whether traffic arrives regularly, just like the received traffic monitoring unit 103 in the fourth embodiment.

An operation in this embodiment is the same as that of the fourth embodiment shown in FIGS. 15 and 16, and a description thereof is omitted.

As described above, according to the present prevention, the terminal monitors regularly generated traffic, and upon occurrence of a predetermined change in traffic, reports it to the base station. Based on the report, the base station performs resource allocation in the persistent scheduling. It is thereby possible to allocate an appropriate resource that satisfies a transmission delay. Further, because the report is made only when the predetermined change occurs in traffic, resource consumption due to signaling can be suppressed.

Further, according to the present prevention, the transmission status of regularly generated traffic is monitored, and if the transmission status does not satisfy a predetermined condition, the transmission status is reported to the base station. Based on the report, the base station performs resource allocation in the persistent scheduling. It is thereby possible to allocate a resource that satisfies a transmission delay. Further, according to the present prevention, the base station monitors the usage rate of resources allocated to the terminal, and if the usage rate is low, reduces the allocated resources. It is thereby possible to avoid excessive resource allocation.

Furthermore, according to the present prevention, the base station monitors the reception status of traffic transmitted from the terminal, performs determination whether it is regular traffic or not, and if it is regular traffic, performs resource allocation in the persistent scheduling. It is thereby possible to allocate a resource in the persistent scheduling even if the base station does not know in advance that it is regular traffic.

Further, according to the present prevention, the base station monitors the usage rate of resources allocated to the terminal, and if the usage rate is low, releases the allocated resources. It is thereby possible to avoid unnecessary resource allocation. Further, at the time of handover, it is feasible to transfer the determined traffic information to a handover destination base station. This saves the handover destination base station the time and trouble to determine whether traffic is periodical or not.

Industrial Applicability

Although each of the above embodiments is described by taking LTE as an example, it is applicable to another communication system as long as it is a communication system in which traffic is generated regularly and which allocates a resource that can be used periodically for transmission of the traffic. Further, it is obvious that the operation procedure of each embodiment described with reference to the flowcharts may be prestored as a program in a recording medium such as ROM and read by a computer for execution.

The invention claimed is:

1. A base station in a communication system including a terminal and the base station itself, where traffic is generated regularly in the terminal, the base station allocates a resource to the terminal, and the terminal transmits the traffic through the resource, comprising:
an allocation unit that determines resource allocation based on a report from the terminal indicating that a transmission status of the traffic does not satisfy a predetermined condition,
wherein the predetermined condition includes that at least one parameter being monitored becomes greater than a threshold of the parameter,
further comprising:
a unit that measures a usage rate of the resource, and a unit that reduces allocated resources when the usage rate is less than a predetermined threshold.

2. A base station in a communication system including a terminal and the base station itself, where traffic is generated in the terminal, the base station allocates a resource to the terminal, and the terminal transmits the traffic through the resource, comprising:
a determination unit that monitors a reception status of the traffic and determines, in dynamic scheduling, whether the traffic is generated regularly based on the reception status, and an allocation unit that allocates, in persistent scheduling, a resource based on the monitoring result when it is determined that the traffic is generated regularly; and ,
wherein the base station transfers the monitoring result to a handover destination base station at a time of handover.

3. The base station according to claim 2, wherein the determination unit calculates a generation interval of the traffic and a generation size of the traffic based on the reception status of the traffic and determines whether each satisfies a predetermined condition.

4. A base station in a communication system including a terminal and the base station itself, where traffic is generated in the terminal, the base station allocates a resource to the terminal, and the terminal transmits the traffic through the resource, comprising:
a determination unit that monitors a reception status of the traffic and determines, in dynamic scheduling, whether the traffic is generated regularly based on the reception status, and an allocation unit that allocates, in persistent scheduling, a resource based on the monitoring result when it is determined that the traffic is generated regularly,
further comprising:
a measurement unit that measures a usage rate of allocated resources, and a release unit that releases the allocated resources when the usage rate is less than a predetermined threshold.

5. A base station in a communication system including a terminal and the base station itself, where traffic to be transmitted to the terminal arrives at the base station, the base station allocates a resource to the terminal, and the base station transmits traffic through the resource, comprising:
a determination unit that that is configured to monitor the traffic and is configured to determine whether the traffic arrives regularly based on the monitoring result, and an allocation unit that is configured to periodically allocate resources that transmit the traffic within a predetermined time period from generation of the traffic based on the monitoring result when it is determined that the traffic arrives regularly,
the determination unit is configured to determine that the traffic arrives regularly when variation of time intervals between arrivals of the traffic is less than a first threshold and a variation of sizes of the traffic is less than a second threshold.

6. The base station according to claim 5, wherein said allocation unit periodically allocates said resource in persistent scheduling.

* * * * *